US008540401B2

(12) United States Patent
Simon et al.

(10) Patent No.: US 8,540,401 B2
(45) Date of Patent: Sep. 24, 2013

(54) LED BULB WITH INTERNAL HEAT DISSIPATING STRUCTURES

(75) Inventors: David L. Simon, Grosse Pointe Woods, MI (US); John Ivey, Farmington Hills, MI (US)

(73) Assignee: iLumisys, Inc., Troy, MI (US)

( * ) Notice: Subject to any disclaimer, the term of this patent is extended or adjusted under 35 U.S.C. 154(b) by 237 days.

(21) Appl. No.: 13/071,985

(22) Filed: Mar. 25, 2011

(65) Prior Publication Data

US 2011/0234076 A1 Sep. 29, 2011

Related U.S. Application Data

(60) Provisional application No. 61/317,871, filed on Mar. 26, 2010.

(51) Int. Cl.
*B60Q 1/06* (2006.01)
*F21V 29/00* (2006.01)

(52) U.S. Cl.
USPC .............................................. 362/373; 313/46

(58) Field of Classification Search
None
See application file for complete search history.

(56) References Cited

U.S. PATENT DOCUMENTS

| | | | |
|---|---|---|---|
| D54,511 | S | 2/1920 | Owen |
| D58,105 | S | 6/1921 | Poritz |
| D79,814 | S | 11/1929 | Hoch |
| D80,419 | S | 1/1930 | Kramer |
| D84,763 | S | 7/1931 | Stange |
| D119,797 | S | 4/1940 | Winkler et al. |
| D125,312 | S | 2/1941 | Logan |
| 2,909,097 | A | 10/1959 | Alden et al. |
| 3,318,185 | A | 5/1967 | Kott |
| 3,561,719 | A | 2/1971 | Grindle |
| 3,586,936 | A | 6/1971 | McLeroy |
| 3,601,621 | A | 8/1971 | Ritchie |
| 3,612,855 | A | 10/1971 | Juhnke |
| 3,643,088 | A | 2/1972 | Osteen et al. |
| 3,746,918 | A | 7/1973 | Drucker et al. |

(Continued)

FOREIGN PATENT DOCUMENTS

| | | | |
|---|---|---|---|
| CN | 1584388 | A | 2/2005 |
| CN | 2766345 | Y | 3/2006 |

(Continued)

OTHER PUBLICATIONS

Notification of Transmittal, International Search Report and Written Opinion of the International Searching Authority dated Aug. 30, 2011 from the corresponding International Application No. PCT/US2011/029994 filed Mar. 25, 2011.

(Continued)

*Primary Examiner* — Anh Mai
*Assistant Examiner* — Britt D Hanley
(74) *Attorney, Agent, or Firm* — Young Basile

(57) ABSTRACT

An LED based light comprises a base, a light structure, a heat dissipating structure, and at least one LED. The light structure is adjacent to the base and extends along a longitudinal axis of the light. The light structure includes an inner surface and an outer surface and defines a cavity, and the heat dissipating structure extends into the cavity. At least one LED is mounted in thermally conductive relation to the heat dissipating structure. In one version, the light structure is an annular flange, and an organic LED is mounted to the outer surface. In another version, the light structure is a light pipe configured to distribute a light produced by the at least one LED in a predetermined light distribution.

21 Claims, 3 Drawing Sheets

(56) References Cited

U.S. PATENT DOCUMENTS 3,818,216 A 6/1974 Larraburu
3,832,503 A 8/1974 Crane
3,858,086 A 12/1974 Anderson et al.
3,909,670 A 9/1975 Wakamatsu et al.
3,924,120 A 12/1975 Cox, III
3,958,885 A 5/1976 Stockinger et al.
3,974,637 A 8/1976 Bergey et al.
3,993,386 A 11/1976 Rowe
4,001,571 A 1/1977 Martin
4,054,814 A 10/1977 Fegley et al.
4,070,568 A 1/1978 Gala
4,082,395 A 4/1978 Donato et al.
4,096,349 A 6/1978 Donato
4,102,558 A 7/1978 Krachman
4,107,581 A 8/1978 Abernethy
4,189,663 A 2/1980 Schmutzer et al.
4,211,955 A 7/1980 Ray
4,241,295 A 12/1980 Williams, Jr.
4,271,408 A 6/1981 Teshima et al.
4,272,689 A 6/1981 Crosby et al.
4,273,999 A 6/1981 Pierpoint
4,298,869 A 11/1981 Okuno
4,329,625 A 5/1982 Nishizawa et al.
4,339,788 A 7/1982 White et al.
4,342,947 A 8/1982 Bloyd
4,367,464 A 1/1983 Kurahashi et al.
D268,134 S 3/1983 Zurcher
4,382,272 A 5/1983 Quella et al.
4,388,567 A 6/1983 Yamazaki et al.
4,388,589 A 6/1983 Molldrem, Jr.
4,392,187 A 7/1983 Bornhorst
4,394,719 A 7/1983 Moberg
4,420,711 A 12/1983 Takahashi et al.
4,455,562 A 6/1984 Dolan et al.
4,500,796 A 2/1985 Quin
4,521,835 A 6/1985 Meggs et al.
4,581,687 A 4/1986 Nakanishi
4,597,033 A 6/1986 Meggs et al.
4,600,972 A 7/1986 MacIntyre
4,607,317 A 8/1986 Lin
4,622,881 A 11/1986 Rand
4,625,152 A 11/1986 Nakai
4,635,052 A 1/1987 Aoike et al.
4,647,217 A 3/1987 Havel
4,656,398 A 4/1987 Michael et al.
4,661,890 A 4/1987 Watanabe et al.
4,668,895 A 5/1987 Schneiter
4,675,575 A 6/1987 Smith et al.
4,682,079 A 7/1987 Sanders et al.
4,686,425 A 8/1987 Havel
4,687,340 A 8/1987 Havel
4,688,154 A 8/1987 Nilssen
4,688,869 A 8/1987 Kelly
4,695,769 A 9/1987 Schweickardt
4,698,730 A 10/1987 Sakai et al.
4,701,669 A 10/1987 Head et al.
4,705,406 A 11/1987 Havel
4,707,141 A 11/1987 Havel
D293,723 S 1/1988 Buttner
4,727,289 A 2/1988 Uchida
4,740,882 A 4/1988 Miller
4,748,545 A 5/1988 Schmitt
4,753,148 A 6/1988 Johnson
4,758,173 A 7/1988 Northrop
4,771,274 A 9/1988 Havel
4,780,621 A 10/1988 Bartleucci et al.
4,794,383 A 12/1988 Havel
4,810,937 A 3/1989 Havel
4,818,072 A 4/1989 Mohebban
4,824,269 A 4/1989 Havel
4,837,565 A 6/1989 White
4,843,627 A 6/1989 Stebbins
4,845,481 A 7/1989 Havel
4,845,745 A 7/1989 Havel
4,857,801 A 8/1989 Farrell
4,863,223 A 9/1989 Weissenbach et al.
4,870,325 A 9/1989 Kazar
4,874,320 A 10/1989 Freed et al.
4,887,074 A 12/1989 Simon et al.
4,894,832 A 1/1990 Colak
4,901,207 A 2/1990 Sato et al.
4,912,371 A 3/1990 Hamilton
4,922,154 A 5/1990 Cacoub
4,929,936 A 5/1990 Friedman et al.
4,934,852 A 6/1990 Havel
4,941,072 A 7/1990 Yasumoto et al.
4,943,900 A 7/1990 Gartner
4,962,687 A 10/1990 Belliveau et al.
4,965,561 A 10/1990 Havel
4,973,835 A 11/1990 Kurosu et al.
4,977,351 A 12/1990 Bavaro et al.
4,979,081 A 12/1990 Leach et al.
4,980,806 A 12/1990 Taylor et al.
4,992,704 A 2/1991 Stinson
5,003,227 A 3/1991 Nilssen
5,008,595 A 4/1991 Kazar
5,008,788 A 4/1991 Palinkas
5,010,459 A 4/1991 Taylor et al.
5,018,054 A 5/1991 Ohashi et al.
5,027,037 A 6/1991 Wei
5,027,262 A 6/1991 Freed
5,032,960 A 7/1991 Katoh
5,034,807 A 7/1991 Von Kohorn
5,036,248 A 7/1991 McEwan et al.
5,038,255 A 8/1991 Nishihashi et al.
5,065,226 A 11/1991 Kluitmans et al.
5,072,216 A 12/1991 Grange
5,078,039 A 1/1992 Tulk et al.
5,083,063 A 1/1992 Brooks
5,088,013 A 2/1992 Revis
5,089,748 A 2/1992 Ihms
5,103,382 A 4/1992 Kondo et al.
5,122,733 A 6/1992 Havel
5,126,634 A 6/1992 Johnson
5,128,595 A 7/1992 Hara
5,130,909 A 7/1992 Gross
5,134,387 A 7/1992 Smith et al.
5,140,220 A 8/1992 Hasegawa
5,142,199 A 8/1992 Elwell
5,151,679 A 9/1992 Dimmick
5,154,641 A 10/1992 McLaughlin
5,161,879 A 11/1992 McDermott
5,161,882 A 11/1992 Garrett
5,164,715 A 11/1992 Kashiwabara et al.
5,184,114 A 2/1993 Brown
5,194,854 A 3/1993 Havel
5,198,756 A 3/1993 Jenkins et al.
5,209,560 A 5/1993 Taylor et al.
5,220,250 A 6/1993 Szuba
5,225,765 A 7/1993 Callahan et al.
5,226,723 A 7/1993 Chen
5,254,910 A 10/1993 Yang
5,256,948 A 10/1993 Boldin et al.
5,278,542 A 1/1994 Smith et al.
5,282,121 A 1/1994 Bornhorst et al.
5,283,517 A 2/1994 Havel
5,287,352 A 2/1994 Jackson et al.
5,294,865 A 3/1994 Haraden
5,298,871 A 3/1994 Shimohara
5,301,090 A 4/1994 Hed
5,303,124 A 4/1994 Wrobel
5,307,295 A 4/1994 Taylor et al.
5,321,593 A 6/1994 Moates
5,323,226 A 6/1994 Schreder
5,329,431 A 7/1994 Taylor et al.
5,344,068 A 9/1994 Haessig
5,350,977 A 9/1994 Hamamoto et al.
5,357,170 A 10/1994 Luchaco et al.
5,371,618 A 12/1994 Tai et al.
5,374,876 A 12/1994 Horibata et al.
5,375,043 A 12/1994 Tokunaga
D354,360 S 1/1995 Murata
5,381,074 A 1/1995 Rudzewicz et al.
5,388,357 A 2/1995 Malita

| | | | |
|---|---|---|---|
| 5,402,702 | A | 4/1995 | Hata |
| 5,404,282 | A | 4/1995 | Klinke et al. |
| 5,406,176 | A | 4/1995 | Sugden |
| 5,410,328 | A | 4/1995 | Yoksza et al. |
| 5,412,284 | A | 5/1995 | Moore et al. |
| 5,412,552 | A | 5/1995 | Fernandes |
| 5,420,482 | A | 5/1995 | Phares |
| 5,421,059 | A | 6/1995 | Leffers, Jr. |
| 5,430,356 | A | 7/1995 | Ference et al. |
| 5,432,408 | A | 7/1995 | Matsuda et al. |
| 5,436,535 | A | 7/1995 | Yang |
| 5,436,853 | A | 7/1995 | Shimohara |
| 5,450,301 | A | 9/1995 | Waltz et al. |
| 5,461,188 | A | 10/1995 | Drago et al. |
| 5,463,280 | A | 10/1995 | Johnson |
| 5,463,502 | A | 10/1995 | Savage, Jr. |
| 5,465,144 | A | 11/1995 | Parker et al. |
| 5,475,300 | A | 12/1995 | Havel |
| 5,489,827 | A | 2/1996 | Xia |
| 5,491,402 | A | 2/1996 | Small |
| 5,493,183 | A | 2/1996 | Kimball |
| 5,504,395 | A | 4/1996 | Johnson et al. |
| 5,506,760 | A | 4/1996 | Giebler et al. |
| 5,513,082 | A | 4/1996 | Asano |
| 5,519,496 | A | 5/1996 | Borgert et al. |
| 5,530,322 | A | 6/1996 | Ference et al. |
| 5,544,809 | A | 8/1996 | Keating et al. |
| 5,545,950 | A | 8/1996 | Cho |
| 5,550,440 | A | 8/1996 | Allison et al. |
| 5,559,681 | A | 9/1996 | Duarte |
| 5,561,346 | A | 10/1996 | Byrne |
| D376,030 | S | 11/1996 | Cohen |
| 5,575,459 | A | 11/1996 | Anderson |
| 5,575,554 | A | 11/1996 | Guritz |
| 5,581,158 | A | 12/1996 | Quazi |
| 5,592,051 | A | 1/1997 | Korkala |
| 5,592,054 | A | 1/1997 | Nerone et al. |
| 5,600,199 | A | 2/1997 | Martin, Sr. et al. |
| 5,607,227 | A | 3/1997 | Yasumoto et al. |
| 5,608,290 | A | 3/1997 | Hutchisson et al. |
| 5,614,788 | A | 3/1997 | Mullins et al. |
| 5,621,282 | A | 4/1997 | Haskell |
| 5,621,603 | A | 4/1997 | Adamec et al. |
| 5,621,662 | A | 4/1997 | Humphries et al. |
| 5,622,423 | A | 4/1997 | Lee |
| 5,633,629 | A | 5/1997 | Hochstein |
| 5,634,711 | A | 6/1997 | Kennedy et al. |
| 5,640,061 | A | 6/1997 | Bornhorst et al. |
| 5,640,141 | A | 6/1997 | Myllymaki |
| 5,642,129 | A | 6/1997 | Zavracky et al. |
| 5,655,830 | A | 8/1997 | Ruskouski |
| 5,656,935 | A | 8/1997 | Havel |
| 5,661,374 | A | 8/1997 | Cassidy et al. |
| 5,661,645 | A | 8/1997 | Hochstein |
| 5,673,059 | A | 9/1997 | Zavracky et al. |
| 5,682,103 | A | 10/1997 | Burrell |
| 5,688,042 | A | 11/1997 | Madadi et al. |
| 5,697,695 | A | 12/1997 | Lin et al. |
| 5,701,058 | A | 12/1997 | Roth |
| 5,712,650 | A | 1/1998 | Barlow |
| 5,721,471 | A | 2/1998 | Begemann et al. |
| 5,725,148 | A | 3/1998 | Hartman |
| 5,726,535 | A | 3/1998 | Yan |
| 5,731,759 | A | 3/1998 | Finucan |
| 5,734,590 | A | 3/1998 | Tebbe |
| 5,751,118 | A | 5/1998 | Mortimer |
| 5,752,766 | A | 5/1998 | Bailey et al. |
| 5,765,940 | A | 6/1998 | Levy et al. |
| 5,769,527 | A | 6/1998 | Taylor et al. |
| 5,784,006 | A | 7/1998 | Hochstein |
| 5,785,227 | A | 7/1998 | Akiba |
| 5,790,329 | A | 8/1998 | Klaus et al. |
| 5,803,579 | A | 9/1998 | Turnbull et al. |
| 5,803,580 | A | 9/1998 | Tseng |
| 5,803,729 | A | 9/1998 | Tsimerman |
| 5,806,965 | A | 9/1998 | Deese |
| 5,808,689 | A | 9/1998 | Small |
| 5,810,463 | A | 9/1998 | Kawahara et al. |
| 5,812,105 | A | 9/1998 | Van de Ven |

| | | | |
|---|---|---|---|
| 5,813,751 | A | 9/1998 | Shaffer |
| 5,813,753 | A | 9/1998 | Vriens et al. |
| 5,821,695 | A | 10/1998 | Vilanilam et al. |
| 5,825,051 | A | 10/1998 | Bauer et al. |
| 5,828,178 | A | 10/1998 | York et al. |
| 5,836,676 | A | 11/1998 | Ando et al. |
| 5,848,837 | A | 12/1998 | Gustafson |
| 5,850,126 | A | 12/1998 | Kanbar |
| 5,851,063 | A | 12/1998 | Doughty et al. |
| 5,852,658 | A | 12/1998 | Knight et al. |
| 5,854,542 | A | 12/1998 | Forbes |
| RE36,030 | E | 1/1999 | Nadeau |
| 5,859,508 | A | 1/1999 | Ge et al. |
| 5,865,529 | A | 2/1999 | Yan |
| 5,890,794 | A | 4/1999 | Abtahi et al. |
| 5,896,010 | A | 4/1999 | Mikolajczak et al. |
| 5,907,742 | A | 5/1999 | Johnson et al. |
| 5,912,653 | A | 6/1999 | Fitch |
| 5,921,660 | A | 7/1999 | Yu |
| 5,924,784 | A | 7/1999 | Chliwnyj et al. |
| 5,927,845 | A | 7/1999 | Gustafson et al. |
| 5,934,792 | A | 8/1999 | Camarota |
| 5,943,802 | A | 8/1999 | Tijanic |
| 5,946,209 | A | 8/1999 | Eckel et al. |
| 5,949,347 | A | 9/1999 | Wu |
| 5,952,680 | A | 9/1999 | Strite |
| 5,959,547 | A | 9/1999 | Tubel et al. |
| 5,962,989 | A | 10/1999 | Baker |
| 5,962,992 | A | 10/1999 | Huang et al. |
| 5,963,185 | A | 10/1999 | Havel |
| 5,974,553 | A | 10/1999 | Gandar |
| 5,980,064 | A | 11/1999 | Metroyanis |
| 5,998,925 | A | 12/1999 | Shimizu et al. |
| 5,998,928 | A | 12/1999 | Hipp |
| 6,007,209 | A | 12/1999 | Pelka |
| 6,008,783 | A | 12/1999 | Kitagawa et al. |
| 6,011,691 | A | 1/2000 | Schreffler |
| 6,016,038 | A | 1/2000 | Mueller et al. |
| 6,018,237 | A | 1/2000 | Havel |
| 6,019,493 | A | 2/2000 | Kuo et al. |
| 6,020,825 | A | 2/2000 | Chansky et al. |
| 6,025,550 | A | 2/2000 | Kato |
| 6,028,694 | A | 2/2000 | Schmidt |
| 6,030,099 | A | 2/2000 | McDermott |
| 6,031,343 | A | 2/2000 | Recknagel et al. |
| D422,737 | S | 4/2000 | Orozco |
| 6,056,420 | A | 5/2000 | Wilson et al. |
| 6,068,383 | A | 5/2000 | Robertson et al. |
| 6,069,597 | A | 5/2000 | Hansen |
| 6,072,280 | A | 6/2000 | Allen |
| 6,084,359 | A | 7/2000 | Hetzel et al. |
| 6,086,220 | A | 7/2000 | Lash et al. |
| 6,091,200 | A | 7/2000 | Lenz |
| 6,092,915 | A | 7/2000 | Rensch |
| 6,095,661 | A | 8/2000 | Lebens et al. |
| 6,097,352 | A | 8/2000 | Zavracky et al. |
| 6,116,748 | A | 9/2000 | George |
| 6,121,875 | A | 9/2000 | Hamm et al. |
| 6,127,783 | A | 10/2000 | Pashley et al. |
| 6,132,072 | A | 10/2000 | Turnbull et al. |
| 6,135,604 | A | 10/2000 | Lin |
| 6,139,174 | A | 10/2000 | Butterworth |
| 6,149,283 | A | 11/2000 | Conway et al. |
| 6,150,774 | A | 11/2000 | Mueller et al. |
| 6,151,529 | A | 11/2000 | Batko |
| 6,153,985 | A | 11/2000 | Grossman |
| 6,158,882 | A | 12/2000 | Bischoff, Jr. |
| 6,166,496 | A | 12/2000 | Lys et al. |
| 6,175,201 | B1 | 1/2001 | Sid |
| 6,175,220 | B1 | 1/2001 | Billig et al. |
| 6,181,126 | B1 | 1/2001 | Havel |
| 6,183,086 | B1 | 2/2001 | Neubert |
| 6,183,104 | B1 | 2/2001 | Ferrara |
| 6,184,628 | B1 | 2/2001 | Ruthenberg |
| 6,196,471 | B1 | 3/2001 | Ruthenberg |
| 6,203,180 | B1 | 3/2001 | Fleischmann |
| 6,211,626 | B1 | 4/2001 | Lys et al. |
| 6,215,409 | B1 | 4/2001 | Blach |
| 6,217,190 | B1 | 4/2001 | Altman et al. |

6,219,239 B1 4/2001 Mellberg et al.
6,227,679 B1 5/2001 Zhang et al.
6,238,075 B1 5/2001 Dealey, Jr. et al.
6,241,359 B1 6/2001 Lin
6,250,774 B1 6/2001 Begemann et al.
6,252,350 B1 6/2001 Alvarez
6,252,358 B1 6/2001 Xydis et al.
6,268,600 B1 7/2001 Nakamura et al.
6,273,338 B1 8/2001 White
6,275,397 B1 8/2001 McClain
6,283,612 B1 9/2001 Hunter
6,292,901 B1 9/2001 Lys et al.
6,293,684 B1 9/2001 Riblett
6,297,724 B1 10/2001 Bryans et al.
6,305,109 B1 10/2001 Lee
6,305,821 B1 10/2001 Hsieh et al.
6,307,331 B1 10/2001 Bonasia et al.
6,310,590 B1 10/2001 Havel
6,323,832 B1 11/2001 Nishizawa et al.
6,325,651 B1 12/2001 Nishihara et al.
6,334,699 B1 1/2002 Gladnick
6,340,868 B1 1/2002 Lys et al.
6,354,714 B1 3/2002 Rhodes
6,361,186 B1 3/2002 Slayden
6,369,525 B1 4/2002 Chang et al.
6,371,637 B1 4/2002 Atchinson et al.
6,379,022 B1 4/2002 Amerson et al.
D457,667 S 5/2002 Piepgras et al.
D457,669 S 5/2002 Piepgras et al.
D457,974 S 5/2002 Piepgras et al.
6,388,393 B1 5/2002 Illingworth
6,394,623 B1 5/2002 Tsui
D458,395 S 6/2002 Piepgras et al.
6,400,096 B1 6/2002 Wells et al.
6,404,131 B1 6/2002 Kawano et al.
6,411,022 B1 6/2002 Machida
6,422,716 B2 7/2002 Henrici et al.
6,428,189 B1 8/2002 Hochstein
D463,610 S 9/2002 Piepgras et al.
6,445,139 B1 9/2002 Marshall et al.
6,448,550 B1 9/2002 Nishimura
6,448,716 B1 9/2002 Hutchison
6,459,919 B1 10/2002 Lys et al.
6,469,457 B2 10/2002 Callahan
6,471,388 B1 10/2002 Marsh
6,472,823 B2 10/2002 Yen
6,473,002 B1 10/2002 Hutchison
D468,035 S 12/2002 Blanc et al.
6,488,392 B1 12/2002 Lu
6,495,964 B1 12/2002 Muthu et al.
6,527,411 B1 3/2003 Sayers
6,528,954 B1 3/2003 Lys et al.
6,528,958 B2 3/2003 Hulshof et al.
6,538,375 B1 3/2003 Duggal et al.
6,548,967 B1 4/2003 Dowling et al.
6,568,834 B1 5/2003 Scianna
6,573,536 B1 6/2003 Dry
6,577,072 B2 6/2003 Saito et al.
6,577,080 B2 6/2003 Lys et al.
6,577,512 B2 6/2003 Tripathi et al.
6,577,794 B1 6/2003 Currie et al.
6,578,979 B2 6/2003 Truttmann-Battig
6,582,103 B1 6/2003 Popovich et al.
6,583,550 B2 6/2003 Iwasa et al.
6,583,573 B2 6/2003 Bierman
6,585,393 B1 7/2003 Brandes et al.
6,586,890 B2 7/2003 Min et al.
6,590,343 B2 7/2003 Pederson
6,592,238 B2 7/2003 Cleaver et al.
6,596,977 B2 7/2003 Muthu et al.
6,598,996 B1 7/2003 Lodhie
6,608,453 B2 8/2003 Morgan et al.
6,608,614 B1 8/2003 Johnson
6,609,804 B2 8/2003 Nolan et al.
6,612,712 B2 9/2003 Nepil
6,612,717 B2 9/2003 Yen
6,621,222 B1 9/2003 Hong
6,623,151 B2 9/2003 Pederson
6,624,597 B2 9/2003 Dowling et al.
D481,484 S 10/2003 Cuevas et al.
6,634,770 B2 10/2003 Cao
6,634,779 B2 10/2003 Reed
6,636,003 B2 10/2003 Rahm et al.
6,639,349 B1 10/2003 Bahadur
6,641,284 B2 11/2003 Stopa et al.
6,659,622 B2 12/2003 Katogi et al.
6,660,935 B2 12/2003 Southard et al.
6,666,689 B1 12/2003 Savage, Jr.
6,667,623 B2 12/2003 Bourgault et al.
6,674,096 B2 1/2004 Sommers
6,676,284 B1 1/2004 Willson
6,679,621 B2 1/2004 West et al.
6,681,154 B2 1/2004 Nierlich et al.
6,682,205 B2 1/2004 Lin
6,683,419 B2 1/2004 Kriparos
6,700,136 B2 3/2004 Guida
6,712,486 B1 3/2004 Popovich et al.
6,717,376 B2 4/2004 Lys et al.
6,717,526 B2 4/2004 Martineau et al.
6,720,745 B2 4/2004 Lys et al.
6,726,348 B2 4/2004 Gloisten
6,741,324 B1 5/2004 Kim
D491,678 S 6/2004 Piepgras
D492,042 S 6/2004 Piepgras
6,744,223 B2 6/2004 Laflamme et al.
6,748,299 B1 6/2004 Motoyama
6,762,562 B2 7/2004 Leong
6,774,584 B2 8/2004 Lys et al.
6,777,891 B2 8/2004 Lys et al.
6,781,329 B2 8/2004 Mueller et al.
6,787,999 B2 9/2004 Stimac et al.
6,788,000 B2 9/2004 Appelberg et al.
6,788,011 B2 9/2004 Mueller et al.
6,791,840 B2 9/2004 Chun
6,796,680 B1 9/2004 Showers et al.
6,801,003 B2 10/2004 Schanberger et al.
6,803,732 B2 10/2004 Kraus et al.
6,806,659 B1 10/2004 Mueller et al.
6,814,470 B2 11/2004 Rizkin et al.
6,815,724 B2 11/2004 Dry
6,846,094 B2 1/2005 Luk
6,851,816 B2 2/2005 Wu et al.
6,851,832 B2 2/2005 Tieszen
6,853,150 B2 2/2005 Clauberg et al.
6,853,151 B2 2/2005 Leong et al.
6,853,563 B1 2/2005 Yang et al.
6,857,924 B2 2/2005 Fu et al.
6,860,628 B2 3/2005 Robertson et al.
6,866,401 B2 3/2005 Sommers et al.
6,869,204 B2 3/2005 Morgan et al.
6,871,981 B2 3/2005 Alexanderson et al.
6,874,924 B1 4/2005 Hulse et al.
6,879,883 B1 4/2005 Motoyama
6,882,111 B2 4/2005 Kan et al.
6,883,929 B2 4/2005 Dowling
6,883,934 B2 4/2005 Kawakami et al.
6,888,322 B2 5/2005 Dowling et al.
6,897,624 B2 5/2005 Lys et al.
6,909,239 B2 6/2005 Gauna
6,909,921 B1 6/2005 Bilger
6,918,680 B2 7/2005 Seeberger
6,921,181 B2 7/2005 Yen
6,936,968 B2 8/2005 Cross et al.
6,936,978 B2 8/2005 Morgan et al.
6,940,230 B2 9/2005 Myron et al.
6,948,829 B2 9/2005 Verdes et al.
6,957,905 B1 10/2005 Pritchard et al.
6,963,175 B2 11/2005 Archenhold et al.
6,964,501 B2 11/2005 Ryan
6,965,197 B2 11/2005 Tyan et al.
6,965,205 B2 11/2005 Piepgras et al.
6,967,448 B2 11/2005 Morgan et al.
6,969,179 B2 11/2005 Sloan et al.
6,969,186 B2 11/2005 Sonderegger et al.
6,969,954 B2 11/2005 Lys
6,975,079 B2 12/2005 Lys et al.
6,979,097 B2 12/2005 Elam et al.
6,982,518 B2 1/2006 Chou et al.

6,995,681 B2 2/2006 Pederson
6,997,576 B1 2/2006 Lodhie et al.
7,004,603 B2 2/2006 Knight
D518,218 S 3/2006 Roberge et al.
7,008,079 B2 3/2006 Smith
7,014,336 B1 3/2006 Ducharme et al.
7,015,650 B2 3/2006 McGrath
7,018,063 B2 3/2006 Michael et al.
7,021,799 B2 4/2006 Mizuyoshi
7,021,809 B2 4/2006 Iwasa et al.
7,024,256 B2 4/2006 Krzyzanowski et al.
7,031,920 B2 4/2006 Dowling et al.
7,033,036 B2 4/2006 Pederson
7,038,398 B1 5/2006 Lys et al.
7,038,399 B2 5/2006 Lys et al.
7,042,172 B2 5/2006 Dowling et al.
7,048,423 B2 5/2006 Stepanenko et al.
7,049,761 B2 5/2006 Timmermans et al.
7,052,171 B1 5/2006 Lefebvre et al.
7,053,557 B2 5/2006 Cross et al.
7,064,498 B2 6/2006 Dowling et al.
7,064,674 B2 6/2006 Pederson
7,067,992 B2 6/2006 Leong et al.
7,077,978 B2 7/2006 Setlur et al.
7,080,927 B2 7/2006 Feuerborn et al.
7,086,747 B2 8/2006 Nielson et al.
7,088,014 B2 8/2006 Nierlich et al.
7,088,904 B2 8/2006 Ryan, Jr.
7,102,902 B1 9/2006 Brown et al.
7,113,541 B1 9/2006 Lys et al.
7,114,830 B2 10/2006 Robertson et al.
7,114,834 B2 10/2006 Rivas et al.
7,118,262 B2 10/2006 Negley
7,119,503 B2 10/2006 Kemper
7,121,679 B2 10/2006 Fujimoto
7,122,976 B1 10/2006 Null et al.
7,128,442 B2 10/2006 Lee et al.
7,128,454 B2 10/2006 Kim et al.
D532,532 S 11/2006 Maxik
7,132,635 B2 11/2006 Dowling
7,132,785 B2 11/2006 Ducharme
7,132,804 B2 11/2006 Lys et al.
7,135,824 B2 11/2006 Lys et al.
7,139,617 B1 11/2006 Morgan et al.
7,144,135 B2 12/2006 Martin et al.
7,153,002 B2 12/2006 Kim et al.
7,161,311 B2 1/2007 Mueller et al.
7,161,313 B2 1/2007 Piepgras et al.
7,161,556 B2 1/2007 Morgan et al.
7,164,110 B2 1/2007 Pitigoi-Aron et al.
7,164,235 B2 1/2007 Ito et al.
7,165,863 B1 1/2007 Thomas et al.
7,165,866 B2 1/2007 Li
7,167,777 B2 1/2007 Budike, Jr.
7,168,843 B2 1/2007 Striebel
D536,468 S 2/2007 Crosby
7,178,941 B2 2/2007 Roberge et al.
7,180,252 B2 2/2007 Lys et al.
D538,950 S 3/2007 Maxik
D538,952 S 3/2007 Maxik et al.
D538,962 S 3/2007 Elliott
7,186,003 B2 3/2007 Dowling et al.
7,186,005 B2 3/2007 Hulse
7,187,141 B2 3/2007 Mueller et al.
7,190,126 B1 3/2007 Paton
7,192,154 B2 3/2007 Becker
7,198,387 B1 4/2007 Gloisten et al.
7,201,491 B2 4/2007 Bayat et al.
7,201,497 B2 4/2007 Weaver, Jr. et al.
7,202,613 B2 4/2007 Morgan et al.
7,204,615 B2 4/2007 Arik et al.
7,204,622 B2 4/2007 Dowling et al.
7,207,696 B1 4/2007 Lin
7,210,818 B2 5/2007 Luk et al.
7,210,957 B2 5/2007 Mrakovich et al.
7,211,959 B1 5/2007 Chou
7,213,934 B2 5/2007 Zarian et al.
7,217,004 B2 5/2007 Park et al.
7,217,012 B2 5/2007 Southard et al.
7,217,022 B2 5/2007 Ruffin
7,218,056 B1 5/2007 Harwood
7,218,238 B2 5/2007 Right et al.
7,220,015 B2 5/2007 Dowling
7,220,018 B2 5/2007 Crabb et al.
7,221,104 B2 5/2007 Lys et al.
7,221,110 B2 5/2007 Sears et al.
7,224,000 B2 5/2007 Aanegola et al.
7,226,189 B2 6/2007 Lee et al.
7,228,052 B1 6/2007 Lin
7,228,190 B2 6/2007 Dowling et al.
7,231,060 B2 6/2007 Dowling et al.
7,233,115 B2 6/2007 Lys
7,233,831 B2 6/2007 Blackwell
7,236,366 B2 6/2007 Chen
7,237,924 B2 7/2007 Martineau et al.
7,237,925 B2 7/2007 Mayer et al.
7,239,532 B1 7/2007 Hsu et al.
7,241,038 B2 7/2007 Naniwa et al.
7,242,152 B2 7/2007 Dowling et al.
7,246,926 B2 7/2007 Harwood
7,246,931 B2 7/2007 Hsieh et al.
7,248,239 B2 7/2007 Dowling et al.
7,249,269 B1 7/2007 Motoyama
7,249,865 B2 7/2007 Robertson
D548,868 S 8/2007 Roberge et al.
7,252,408 B2 8/2007 Mazzochette et al.
7,253,566 B2 8/2007 Lys et al.
7,255,457 B2 8/2007 Ducharme et al.
7,255,460 B2 8/2007 Lee
7,256,554 B2 8/2007 Lys
7,258,458 B2 8/2007 Mochiachvili et al.
7,258,467 B2 8/2007 Saccomanno et al.
7,259,528 B2 8/2007 Pilz
7,262,439 B2 8/2007 Setlur et al.
7,264,372 B2 9/2007 Maglica
7,267,467 B2 9/2007 Wu et al.
7,270,443 B2 9/2007 Kurtz et al.
7,271,794 B1 9/2007 Cheng et al.
7,273,300 B2 9/2007 Mrakovich
7,274,045 B2 9/2007 Chandran et al.
7,274,160 B2 9/2007 Mueller et al.
D553,267 S 10/2007 Yuen
7,285,801 B2 10/2007 Eliashevich et al.
7,288,902 B1 10/2007 Melanson
7,296,912 B2 11/2007 Beauchamp
7,300,184 B2 11/2007 Ichikawa et al.
7,300,192 B2 11/2007 Mueller et al.
D556,937 S 12/2007 Ly
D557,854 S 12/2007 Lewis
7,303,300 B2 12/2007 Dowling et al.
7,306,353 B2 12/2007 Popovich et al.
7,307,391 B2 12/2007 Shan
7,308,296 B2 12/2007 Lys et al.
7,309,965 B2 12/2007 Dowling et al.
7,318,658 B2 1/2008 Wang et al.
7,319,244 B2 1/2008 Liu et al.
7,319,246 B2 1/2008 Soules et al.
7,321,191 B2 1/2008 Setlur et al.
7,326,964 B2 2/2008 Lim et al.
7,327,281 B2 2/2008 Hutchison
7,329,031 B2 2/2008 Liaw et al.
D563,589 S 3/2008 Hariri et al.
7,345,320 B2 3/2008 Dahm
7,348,604 B2 3/2008 Matheson
7,350,936 B2 4/2008 Ducharme et al.
7,350,952 B2 4/2008 Nishigaki
7,352,138 B2 4/2008 Lys et al.
7,352,339 B2 4/2008 Morgan et al.
7,353,071 B2 4/2008 Blackwell et al.
7,358,679 B2 4/2008 Lys et al.
7,358,929 B2 4/2008 Mueller et al.
7,374,327 B2 5/2008 Schexnaider
7,385,359 B2 6/2008 Dowling et al.
7,391,159 B2 6/2008 Harwood
7,396,146 B2 7/2008 Wang
7,401,935 B2 7/2008 VanderSchuit
7,401,945 B2 7/2008 Zhang
7,427,840 B2 9/2008 Morgan et al.

| | | | |
|---|---|---|---|
| 7,429,117 | B2 | 9/2008 | Pohlert et al. |
| 7,434,964 | B1 | 10/2008 | Zheng et al. |
| 7,438,441 | B2 | 10/2008 | Sun et al. |
| D580,089 | S | 11/2008 | Ly et al. |
| D581,556 | S | 11/2008 | To et al. |
| 7,449,847 | B2 | 11/2008 | Schanberger et al. |
| D582,577 | S | 12/2008 | Yuen |
| D584,428 | S | 1/2009 | Li et al. |
| 7,476,002 | B2 | 1/2009 | Wolf et al. |
| 7,476,004 | B2 | 1/2009 | Chan |
| 7,478,924 | B2 | 1/2009 | Robertson |
| D586,484 | S | 2/2009 | Liu et al. |
| D586,928 | S | 2/2009 | Liu et al. |
| 7,490,957 | B2 | 2/2009 | Leong et al. |
| 7,497,596 | B2 | 3/2009 | Ge |
| 7,507,001 | B2 | 3/2009 | Kit |
| 7,510,299 | B2 | 3/2009 | Timmermans et al. |
| 7,520,635 | B2 | 4/2009 | Wolf et al. |
| 7,521,872 | B2 | 4/2009 | Bruning |
| 7,524,089 | B2 | 4/2009 | Park |
| D592,766 | S | 5/2009 | Zhu et al. |
| D593,223 | S | 5/2009 | Komar |
| 7,534,002 | B2 | 5/2009 | Yamaguchi et al. |
| 7,549,769 | B2 | 6/2009 | Kim et al. |
| 7,556,396 | B2 | 7/2009 | Kuo et al. |
| 7,572,030 | B2 | 8/2009 | Booth et al. |
| 7,575,339 | B2 | 8/2009 | Hung |
| 7,579,786 | B2 | 8/2009 | Soos |
| 7,583,035 | B2 | 9/2009 | Shteynberg et al. |
| 7,602,559 | B2 | 10/2009 | Jang et al. |
| 7,619,366 | B2 | 11/2009 | Diederiks |
| 7,635,201 | B2 | 12/2009 | Deng |
| 7,639,517 | B2 | 12/2009 | Zhou et al. |
| D612,528 | S | 3/2010 | McGrath et al. |
| 7,690,813 | B2 | 4/2010 | Kanamori et al. |
| 7,710,047 | B2 | 5/2010 | Shteynberg et al. |
| 7,712,918 | B2 | 5/2010 | Siemiet et al. |
| 7,828,471 | B2 | 11/2010 | Lin |
| 7,843,150 | B2 | 11/2010 | Wang et al. |
| 2001/0033488 | A1 | 10/2001 | Chliwnyj et al. |
| 2001/0045803 | A1 | 11/2001 | Cencur |
| 2002/0011801 | A1 | 1/2002 | Chang |
| 2002/0038157 | A1 | 3/2002 | Dowling et al. |
| 2002/0044066 | A1 | 4/2002 | Dowling et al. |
| 2002/0047569 | A1 | 4/2002 | Dowling et al. |
| 2002/0047624 | A1 | 4/2002 | Stam et al. |
| 2002/0047628 | A1 | 4/2002 | Morgan et al. |
| 2002/0048169 | A1 | 4/2002 | Dowling et al. |
| 2002/0057061 | A1 | 5/2002 | Mueller et al. |
| 2002/0060526 | A1 | 5/2002 | Timmermans et al. |
| 2002/0070688 | A1 | 6/2002 | Dowling et al. |
| 2002/0074559 | A1 | 6/2002 | Dowling et al. |
| 2002/0074958 | A1 | 6/2002 | Crenshaw |
| 2002/0078221 | A1 | 6/2002 | Blackwell et al. |
| 2002/0101197 | A1 | 8/2002 | Lys et al. |
| 2002/0113555 | A1 | 8/2002 | Lys et al. |
| 2002/0130627 | A1 | 9/2002 | Morgan et al. |
| 2002/0145394 | A1 | 10/2002 | Morgan et al. |
| 2002/0145869 | A1 | 10/2002 | Dowling |
| 2002/0152045 | A1 | 10/2002 | Dowling et al. |
| 2002/0152298 | A1 | 10/2002 | Kikta et al. |
| 2002/0153851 | A1 | 10/2002 | Morgan et al. |
| 2002/0158583 | A1 | 10/2002 | Lys et al. |
| 2002/0163316 | A1 | 11/2002 | Lys et al. |
| 2002/0171365 | A1 | 11/2002 | Morgan et al. |
| 2002/0171377 | A1 | 11/2002 | Mueller et al. |
| 2002/0171378 | A1 | 11/2002 | Morgan et al. |
| 2002/0176259 | A1 | 11/2002 | Ducharme |
| 2002/0179816 | A1 | 12/2002 | Haines et al. |
| 2002/0195975 | A1 | 12/2002 | Schanberger et al. |
| 2003/0011538 | A1 | 1/2003 | Lys et al. |
| 2003/0028260 | A1 | 2/2003 | Blackwell |
| 2003/0031015 | A1 | 2/2003 | Ishibashi |
| 2003/0048641 | A1 | 3/2003 | Alexanderson et al. |
| 2003/0057884 | A1 | 3/2003 | Dowling et al. |
| 2003/0057886 | A1 | 3/2003 | Lys et al. |
| 2003/0057887 | A1 | 3/2003 | Dowling et al. |
| 2003/0057890 | A1 | 3/2003 | Lys et al. |
| 2003/0076281 | A1 | 4/2003 | Morgan et al. |
| 2003/0085710 | A1 | 5/2003 | Bourgault et al. |
| 2003/0095404 | A1 | 5/2003 | Becks et al. |
| 2003/0100837 | A1 | 5/2003 | Lys et al. |
| 2003/0102810 | A1 | 6/2003 | Cross et al. |
| 2003/0133292 | A1 | 7/2003 | Mueller et al. |
| 2003/0137258 | A1 | 7/2003 | Piepgras et al. |
| 2003/0185005 | A1 | 10/2003 | Sommers et al. |
| 2003/0185014 | A1 | 10/2003 | Gloisten |
| 2003/0189412 | A1 | 10/2003 | Cunningham |
| 2003/0222587 | A1 | 12/2003 | Dowling, Jr. et al. |
| 2004/0003545 | A1 | 1/2004 | Gillespie |
| 2004/0012959 | A1 | 1/2004 | Robertson et al. |
| 2004/0036006 | A1 | 2/2004 | Dowling |
| 2004/0037088 | A1 | 2/2004 | English et al. |
| 2004/0052076 | A1 | 3/2004 | Mueller et al. |
| 2004/0062041 | A1 | 4/2004 | Cross et al. |
| 2004/0075572 | A1 | 4/2004 | Buschmann et al. |
| 2004/0080960 | A1 | 4/2004 | Wu |
| 2004/0090191 | A1 | 5/2004 | Mueller et al. |
| 2004/0090787 | A1 | 5/2004 | Dowling et al. |
| 2004/0105261 | A1 | 6/2004 | Ducharme et al. |
| 2004/0105264 | A1 | 6/2004 | Spero |
| 2004/0113568 | A1 | 6/2004 | Dowling et al. |
| 2004/0116039 | A1 | 6/2004 | Mueller et al. |
| 2004/0124782 | A1 | 7/2004 | Yu |
| 2004/0130909 | A1 | 7/2004 | Mueller et al. |
| 2004/0141321 | A1 | 7/2004 | Dowling et al. |
| 2004/0155609 | A1 | 8/2004 | Lys et al. |
| 2004/0160199 | A1 | 8/2004 | Morgan et al. |
| 2004/0178751 | A1 | 9/2004 | Mueller et al. |
| 2004/0189218 | A1 | 9/2004 | Leong et al. |
| 2004/0189262 | A1 | 9/2004 | McGrath |
| 2004/0212320 | A1 | 10/2004 | Dowling et al. |
| 2004/0212321 | A1 | 10/2004 | Lys et al. |
| 2004/0212993 | A1 | 10/2004 | Morgan et al. |
| 2004/0223328 | A1 | 11/2004 | Lee et al. |
| 2004/0240890 | A1 | 12/2004 | Lys et al. |
| 2004/0251854 | A1 | 12/2004 | Matsuda et al. |
| 2004/0257007 | A1 | 12/2004 | Lys et al. |
| 2005/0013133 | A1 | 1/2005 | Yeh |
| 2005/0024877 | A1 | 2/2005 | Frederick |
| 2005/0030744 | A1 | 2/2005 | Ducharme et al. |
| 2005/0035728 | A1 | 2/2005 | Schanberger et al. |
| 2005/0036300 | A1 | 2/2005 | Dowling et al. |
| 2005/0040774 | A1 | 2/2005 | Mueller et al. |
| 2005/0041161 | A1 | 2/2005 | Dowling et al. |
| 2005/0041424 | A1 | 2/2005 | Ducharme |
| 2005/0043907 | A1 | 2/2005 | Eckel et al. |
| 2005/0044617 | A1 | 3/2005 | Mueller et al. |
| 2005/0047132 | A1 | 3/2005 | Dowling et al. |
| 2005/0047134 | A1 | 3/2005 | Mueller et al. |
| 2005/0062440 | A1 | 3/2005 | Lys et al. |
| 2005/0063194 | A1 | 3/2005 | Lys et al. |
| 2005/0078477 | A1 | 4/2005 | Lo |
| 2005/0099824 | A1 | 5/2005 | Dowling et al. |
| 2005/0107694 | A1 | 5/2005 | Jansen et al. |
| 2005/0110384 | A1 | 5/2005 | Peterson |
| 2005/0116667 | A1 | 6/2005 | Mueller et al. |
| 2005/0128751 | A1 | 6/2005 | Roberge et al. |
| 2005/0141225 | A1 | 6/2005 | Striebel |
| 2005/0151489 | A1 | 7/2005 | Lys et al. |
| 2005/0151663 | A1 | 7/2005 | Tanguay |
| 2005/0154494 | A1 | 7/2005 | Ahmed |
| 2005/0174473 | A1 | 8/2005 | Morgan et al. |
| 2005/0174780 | A1 | 8/2005 | Park |
| 2005/0184667 | A1 | 8/2005 | Sturman et al. |
| 2005/0201112 | A1 | 9/2005 | Machi et al. |
| 2005/0206529 | A1 | 9/2005 | St.-Germain |
| 2005/0213320 | A1 | 9/2005 | Kazuhiro et al. |
| 2005/0213352 | A1 | 9/2005 | Lys |
| 2005/0213353 | A1 | 9/2005 | Lys |
| 2005/0218838 | A1 | 10/2005 | Lys |
| 2005/0218870 | A1 | 10/2005 | Lys |
| 2005/0219860 | A1 | 10/2005 | Schexnaider |
| 2005/0219872 | A1 | 10/2005 | Lys |
| 2005/0225979 | A1 | 10/2005 | Robertson et al. |
| 2005/0231133 | A1 | 10/2005 | Lys |
| 2005/0236029 | A1 | 10/2005 | Dowling |
| 2005/0236998 | A1 | 10/2005 | Mueller et al. |

2005/0248299 A1 11/2005 Chemel et al.
2005/0253533 A1 11/2005 Lys et al.
2005/0259424 A1 11/2005 Zampini, II et al.
2005/0265019 A1 12/2005 Sommers et al.
2005/0275626 A1 12/2005 Mueller et al.
2005/0276051 A1 12/2005 Caudle et al.
2005/0276053 A1 12/2005 Nortrup et al.
2005/0276064 A1 12/2005 Wu et al.
2005/0285547 A1 12/2005 Piepgras et al.
2006/0002110 A1 1/2006 Dowling et al.
2006/0012987 A9 1/2006 Ducharme et al.
2006/0012997 A1 1/2006 Catalano et al.
2006/0016960 A1 1/2006 Morgan et al.
2006/0022214 A1 2/2006 Morgan et al.
2006/0028155 A1 2/2006 Young
2006/0028837 A1 2/2006 Mrakovich
2006/0034078 A1 2/2006 Kovacik et al.
2006/0050509 A9 3/2006 Dowling et al.
2006/0050514 A1 3/2006 Opolka
2006/0076908 A1 4/2006 Morgan et al.
2006/0092640 A1 5/2006 Li
2006/0098077 A1 5/2006 Dowling
2006/0104058 A1 5/2006 Chemel et al.
2006/0109648 A1 5/2006 Trenchard et al.
2006/0109649 A1 5/2006 Ducharme et al.
2006/0109661 A1 5/2006 Coushaine et al.
2006/0126325 A1 6/2006 Lefebvre et al.
2006/0126338 A1 6/2006 Mighetto
2006/0132061 A1 6/2006 McCormick et al.
2006/0132323 A1 6/2006 Grady, Jr.
2006/0146531 A1 7/2006 Reo et al.
2006/0152172 A9 7/2006 Mueller et al.
2006/0158881 A1 7/2006 Dowling
2006/0170376 A1 8/2006 Piepgras et al.
2006/0192502 A1 8/2006 Brown et al.
2006/0193131 A1 8/2006 McGrath et al.
2006/0197661 A1 9/2006 Tracy et al.
2006/0198128 A1 9/2006 Piepgras et al.
2006/0208667 A1 9/2006 Lys et al.
2006/0215422 A1 9/2006 Laizure, Jr. et al.
2006/0220595 A1 10/2006 Lu
2006/0221606 A1 10/2006 Dowling
2006/0221619 A1 10/2006 Nishigaki
2006/0232974 A1 10/2006 Lee et al.
2006/0262516 A9 11/2006 Dowling et al.
2006/0262521 A1 11/2006 Piepgras et al.
2006/0262544 A1 11/2006 Piepgras et al.
2006/0262545 A1 11/2006 Piepgras et al.
2006/0265921 A1 11/2006 Korall et al.
2006/0273741 A1 12/2006 Stalker, III
2006/0274529 A1 12/2006 Cao
2006/0285325 A1 12/2006 Ducharme et al.
2007/0035255 A1 2/2007 Shuster et al.
2007/0035538 A1 2/2007 Garcia et al.
2007/0035965 A1 2/2007 Holst
2007/0040516 A1 2/2007 Chen
2007/0041220 A1 2/2007 Lynch
2007/0047227 A1 3/2007 Ducharme
2007/0053182 A1 3/2007 Robertson
2007/0053208 A1 3/2007 Justel et al.
2007/0064419 A1 3/2007 Gandhi
2007/0070621 A1 3/2007 Rivas et al.
2007/0070631 A1 3/2007 Huang et al.
2007/0081423 A1 4/2007 Chien
2007/0086754 A1 4/2007 Lys et al.
2007/0086912 A1 4/2007 Dowling et al.
2007/0097678 A1 5/2007 Yang
2007/0109763 A1 5/2007 Wolf et al.
2007/0115658 A1 5/2007 Mueller et al.
2007/0115665 A1 5/2007 Mueller et al.
2007/0120594 A1 5/2007 Balakrishnan et al.
2007/0127234 A1 6/2007 Jervey, III
2007/0133202 A1 6/2007 Huang et al.
2007/0139938 A1 6/2007 Petroski et al.
2007/0145915 A1 6/2007 Roberge et al.
2007/0147046 A1 6/2007 Arik et al.
2007/0152797 A1 7/2007 Chemel et al.
2007/0152808 A1 7/2007 LaCasse
2007/0153514 A1 7/2007 Dowling et al.
2007/0159828 A1 7/2007 Wang
2007/0165402 A1 7/2007 Weaver, Jr. et al.
2007/0173978 A1 7/2007 Fein et al.
2007/0177382 A1 8/2007 Pritchard et al.
2007/0182387 A1 8/2007 Weirich
2007/0188114 A1 8/2007 Lys et al.
2007/0188427 A1 8/2007 Lys et al.
2007/0189026 A1 8/2007 Chemel et al.
2007/0195526 A1 8/2007 Dowling et al.
2007/0195527 A1 8/2007 Russell
2007/0195532 A1 8/2007 Reisenauer et al.
2007/0205712 A1 9/2007 Radkov et al.
2007/0206375 A1 9/2007 Piepgras et al.
2007/0211463 A1 9/2007 Chevalier et al.
2007/0228999 A1 10/2007 Kit
2007/0235751 A1 10/2007 Radkov et al.
2007/0236156 A1 10/2007 Lys et al.
2007/0237284 A1 10/2007 Lys et al.
2007/0240346 A1 10/2007 Li et al.
2007/0241657 A1 10/2007 Radkov et al.
2007/0242466 A1 10/2007 Wu et al.
2007/0247450 A1 10/2007 Lee
2007/0247842 A1 10/2007 Zampini et al.
2007/0247847 A1 10/2007 Villard
2007/0247851 A1 10/2007 Villard
2007/0258231 A1 11/2007 Koerner et al.
2007/0258240 A1 11/2007 Ducharme et al.
2007/0263379 A1 11/2007 Dowling
2007/0274070 A1 11/2007 Wedell
2007/0281520 A1 12/2007 Insalaco et al.
2007/0285926 A1 12/2007 Maxik
2007/0285933 A1 12/2007 Southard et al.
2007/0290625 A1 12/2007 He et al.
2007/0291483 A1 12/2007 Lys
2007/0296350 A1 12/2007 Maxik et al.
2008/0003664 A1 1/2008 Tysoe et al.
2008/0007945 A1 1/2008 Kelly et al.
2008/0012502 A1 1/2008 Lys
2008/0012506 A1 1/2008 Mueller et al.
2008/0013316 A1 1/2008 Chiang
2008/0013324 A1 1/2008 Yu
2008/0018261 A1 1/2008 Kastner
2008/0024067 A1 1/2008 Ishibashi
2008/0037226 A1 2/2008 Shin et al.
2008/0037245 A1 2/2008 Chan
2008/0037284 A1 2/2008 Rudisill
2008/0062680 A1 3/2008 Timmermans et al.
2008/0089075 A1 4/2008 Hsu
2008/0092800 A1 4/2008 Smith et al.
2008/0093615 A1 4/2008 Lin et al.
2008/0093998 A1 4/2008 Dennery et al.
2008/0094837 A1 4/2008 Dobbins et al.
2008/0130267 A1 6/2008 Dowling et al.
2008/0151535 A1 6/2008 de Castris
2008/0158871 A1 7/2008 McAvoy et al.
2008/0158887 A1 7/2008 Zhu et al.
2008/0164826 A1 7/2008 Lys
2008/0164827 A1 7/2008 Lys
2008/0164854 A1 7/2008 Lys
2008/0175003 A1 7/2008 Tsou et al.
2008/0180036 A1 7/2008 Garrity et al.
2008/0186704 A1 8/2008 Chou et al.
2008/0192436 A1 8/2008 Peng et al.
2008/0198598 A1 8/2008 Ward
2008/0211386 A1 9/2008 Choi et al.
2008/0211419 A1 9/2008 Garrity
2008/0218993 A1 9/2008 Li
2008/0224629 A1 9/2008 Melanson
2008/0224636 A1 9/2008 Melanson
2008/0253125 A1 10/2008 Kang et al.
2008/0258647 A1 10/2008 Scianna
2008/0285257 A1 11/2008 King
2008/0285266 A1 11/2008 Thomas
2008/0290814 A1 11/2008 Leong et al.
2008/0291675 A1 11/2008 Lin et al.
2008/0315773 A1 12/2008 Pang
2008/0315784 A1 12/2008 Tseng
2009/0002995 A1 1/2009 Lee et al.
2009/0016063 A1 1/2009 Hu

| | | | |
|---|---|---|---|
| 2009/0021140 | A1 | 1/2009 | Isao et al. |
| 2009/0046473 | A1 | 2/2009 | Tsai et al. |
| 2009/0052186 | A1 | 2/2009 | Xue |
| 2009/0059559 | A1 | 3/2009 | Pabst et al. |
| 2009/0067182 | A1 | 3/2009 | Hsu et al. |
| 2009/0086492 | A1 | 4/2009 | Meyer |
| 2009/0091938 | A1 | 4/2009 | Jacobson et al. |
| 2009/0140285 | A1 | 6/2009 | Lin et al. |
| 2009/0175041 | A1 | 7/2009 | Yuen et al. |
| 2009/0185373 | A1 | 7/2009 | Grajcar |
| 2009/0195186 | A1 | 8/2009 | Guest et al. |
| 2009/0196034 | A1 | 8/2009 | Gherardini et al. |
| 2009/0213588 | A1 | 8/2009 | Manes |
| 2009/0273926 | A1 | 11/2009 | Deng |
| 2009/0303720 | A1 | 12/2009 | Mcgrath |
| 2009/0316408 | A1 | 12/2009 | Villard |
| 2010/0008085 | A1 | 1/2010 | Ivey et al. |
| 2010/0019689 | A1 | 1/2010 | Shan |
| 2010/0027259 | A1 | 2/2010 | Simon et al. |
| 2010/0033095 | A1 | 2/2010 | Sadwick |
| 2010/0033964 | A1 | 2/2010 | Choi et al. |
| 2010/0096992 | A1 | 4/2010 | Yamamoto et al. |
| 2010/0096998 | A1 | 4/2010 | Beers |
| 2010/0103664 | A1 | 4/2010 | Simon et al. |
| 2010/0109550 | A1 | 5/2010 | Huda et al. |
| 2010/0109558 | A1 | 5/2010 | Chew |
| 2010/0164404 | A1 | 7/2010 | Shao et al. |
| 2010/0265732 | A1 | 10/2010 | Liu |
| 2010/0277069 | A1 | 11/2010 | Janik et al. |
| 2010/0289418 | A1 | 11/2010 | Langovsky |

FOREIGN PATENT DOCUMENTS

| | | | |
|---|---|---|---|
| CN | 2869556 | Y | 2/2007 |
| EP | 0013782 | B1 | 3/1983 |
| EP | 0091172 | A2 | 10/1983 |
| EP | 0124924 | B1 | 9/1987 |
| EP | 0174699 | B1 | 11/1988 |
| EP | 0197602 | B1 | 11/1990 |
| EP | 0214701 | B1 | 3/1992 |
| EP | 0262713 | B1 | 6/1992 |
| EP | 0203668 | B1 | 2/1993 |
| EP | 0272749 | B1 | 8/1993 |
| EP | 0337567 | B1 | 11/1993 |
| EP | 0390262 | B1 | 12/1993 |
| EP | 0359329 | B1 | 3/1994 |
| EP | 0403011 | B1 | 4/1994 |
| EP | 0632511 | A2 | 1/1995 |
| EP | 0432848 | B1 | 4/1995 |
| EP | 0403001 | B1 | 8/1995 |
| EP | 0525876 | B1 | 5/1996 |
| EP | 0714556 | B1 | 1/1999 |
| EP | 0458408 | B1 | 9/1999 |
| EP | 0578302 | B1 | 9/1999 |
| EP | 0723701 | B1 | 1/2000 |
| EP | 0787419 | B1 | 5/2001 |
| EP | 1195740 | A2 | 4/2002 |
| EP | 1016062 | B1 | 8/2002 |
| EP | 1195740 | A3 | 1/2003 |
| EP | 1149510 | B1 | 2/2003 |
| EP | 1056993 | B1 | 3/2003 |
| EP | 0766436 | B1 | 5/2003 |
| EP | 0924281 | B1 | 5/2003 |
| EP | 0826167 | B1 | 6/2003 |
| EP | 1147686 | B1 | 1/2004 |
| EP | 1142452 | B1 | 3/2004 |
| EP | 1145602 | B1 | 3/2004 |
| EP | 1422975 | A1 | 5/2004 |
| EP | 0890059 | B1 | 6/2004 |
| EP | 1348319 | B1 | 6/2005 |
| EP | 1037862 | B1 | 7/2005 |
| EP | 1346609 | B1 | 8/2005 |
| EP | 1321012 | B1 | 12/2005 |
| EP | 1610593 | A2 | 12/2005 |
| EP | 1624728 | A1 | 2/2006 |
| EP | 1415517 | B1 | 5/2006 |
| EP | 1415518 | B1 | 5/2006 |
| EP | 1438877 | B1 | 5/2006 |
| EP | 1166604 | B1 | 6/2006 |
| EP | 1479270 | B1 | 7/2006 |
| EP | 1348318 | B1 | 8/2006 |
| EP | 1399694 | B1 | 8/2006 |
| EP | 1461980 | B1 | 10/2006 |
| EP | 1110120 | B1 | 4/2007 |
| EP | 1440604 | B1 | 4/2007 |
| EP | 1047903 | B1 | 6/2007 |
| EP | 1500307 | B1 | 6/2007 |
| EP | 0922305 | B1 | 8/2007 |
| EP | 0922306 | B1 | 8/2007 |
| EP | 1194918 | B1 | 8/2007 |
| EP | 1048085 | B1 | 11/2007 |
| EP | 1763650 | B1 | 12/2007 |
| EP | 1776722 | B1 | 1/2008 |
| EP | 1459599 | B1 | 2/2008 |
| EP | 1887836 | A2 | 2/2008 |
| EP | 1579733 | B1 | 4/2008 |
| EP | 1145282 | B1 | 7/2008 |
| EP | 1157428 | B1 | 9/2008 |
| EP | 1000522 | B1 | 12/2008 |
| EP | 1502483 | B1 | 12/2008 |
| EP | 1576858 | B1 | 12/2008 |
| EP | 1646092 | B1 | 1/2009 |
| EP | 1579736 | B1 | 2/2009 |
| EP | 1889519 | B1 | 3/2009 |
| EP | 1537354 | B1 | 4/2009 |
| EP | 1518445 | B1 | 5/2009 |
| EP | 1337784 | B1 | 6/2009 |
| EP | 2013530 | B1 | 8/2009 |
| EP | 1461982 | B1 | 9/2009 |
| GB | 2215024 | A | 9/1989 |
| GB | 2324901 | A | 11/1998 |
| JP | 06-054289 | | 2/1994 |
| JP | 6-54103 | U | 7/1994 |
| JP | 08-162677 | | 7/1994 |
| JP | 7-249467 | | 9/1995 |
| JP | 7264036 | | 10/1995 |
| JP | 11-135274 | A | 5/1999 |
| JP | 2001-238272 | A | 8/2001 |
| JP | 2002-141555 | A | 5/2002 |
| JP | 3098271 | U | 2/2004 |
| JP | 2004119078 | A | 4/2004 |
| JP | 2004-335426 | | 11/2004 |
| JP | 2005-158363 | A | 6/2005 |
| JP | 2005-166617 | A | 6/2005 |
| JP | 2005-347214 | A | 12/2005 |
| JP | 2006-507641 | A | 3/2006 |
| JP | 3139714 | U | 2/2008 |
| JP | 2008186758 | A | 8/2008 |
| JP | 2008-258124 | A | 10/2008 |
| JP | 2008293753 | A | 12/2008 |
| KR | 10-2004-0008244 | A | 1/2004 |
| KR | 20-0430022 | Y1 | 11/2006 |
| KR | 10-0781652 | B1 | 12/2007 |
| KR | 100844538 | B1 | 7/2008 |
| KR | 100888669 | B1 | 3/2009 |
| TW | M337036 | | 7/2008 |
| WO | 9906759 | A1 | 2/1999 |
| WO | 99/10867 | A1 | 3/1999 |
| WO | 99/31560 | A2 | 6/1999 |
| WO | 9945312 | A1 | 9/1999 |
| WO | 00/01067 | A2 | 1/2000 |
| WO | 02/25842 | A2 | 3/2002 |
| WO | 02/061330 | A2 | 8/2002 |
| WO | 02/069306 | A2 | 9/2002 |
| WO | 02/091805 | A2 | 11/2002 |
| WO | 02/098182 | A2 | 12/2002 |
| WO | 02/099780 | A2 | 12/2002 |
| WO | 03/026358 | A1 | 3/2003 |
| WO | 03/055273 | A2 | 7/2003 |
| WO | 03/067934 | A2 | 8/2003 |
| WO | 03/090890 | A1 | 11/2003 |
| WO | 03/096761 | A1 | 11/2003 |
| WO | 2004/021747 | A2 | 3/2004 |
| WO | 2004/023850 | A2 | 3/2004 |
| WO | 2004/032572 | A2 | 4/2004 |
| WO | 2004057924 | A1 | 7/2004 |
| WO | 2004/100624 | A2 | 11/2004 |
| WO | 2005031860 | A2 | 4/2005 |
| WO | 2005/052751 | A2 | 6/2005 |

| | | | |
|---|---|---|---|
| WO | 2005/060309 | A2 | 6/2005 |
| WO | 2005/084339 | A2 | 9/2005 |
| WO | 2005/089293 | A2 | 9/2005 |
| WO | 2005/089309 | A2 | 9/2005 |
| WO | 2006/023149 | A2 | 3/2006 |
| WO | 2006044328 | A1 | 4/2006 |
| WO | 2006056210 | A1 | 6/2006 |
| WO | 2006/093889 | A2 | 9/2006 |
| WO | 2006/127666 | A2 | 11/2006 |
| WO | 2006/127785 | A2 | 11/2006 |
| WO | 2006/133272 | A2 | 12/2006 |
| WO | 2006137686 | A1 | 12/2006 |
| WO | 2007/081674 | A1 | 7/2007 |
| WO | 2007/094810 | A2 | 8/2007 |
| WO | 2007090292 | A1 | 8/2007 |
| WO | 2008137460 | A2 | 11/2008 |
| WO | 9957945 | A1 | 9/2009 |
| WO | 2010014437 | A2 | 2/2010 |
| WO | 2010/030509 | A2 | 3/2010 |

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online], [retrieved on Jan. 13, 2000] Retrieved from the Dialight Web Page using Internet <URL: http://www.dialight.com/trans.htm>.

LED Lights, Replacement LED lamps for any incandescent light, [online], [retrieved on Jan. 13, 2000] Retrieved from LED Lights Web Page using Internet <URL: http://www.ledlights.com/replac.htm>.

LEDTRONICS, LEDTRONICS Catalog, 1996, p. 10, LEDTRONICS, Torrance, California.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.

Phason Electronic Control Systems, Light Level Controller (LLC) case study. Nov. 30, 2004. 3 pages, Phason Inc., Winnipeg, Manitoba, Canada.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

D.N.A-III [online], [retrieved Mar. 10, 2009] Retrieved from the PLC Lighting Web Page using Internet <URL: http://www.plclighting.com/product_info.php?cPath=1&products_id=92>.

E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.

E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.

E20524-10 & E20525-10 Curve Collection, [online], [retrieved on Jul. 10, 2010] Retrieved from ET2 Contemporary Lighting using Internet <URL: http://www.et2online.com/proddetail.aspx?ItemID=E20524-10 & E20525-10>.

E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.

E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT$_{13}$ Archive/BNP_GUID_9-5-2006_A_10000000000000056772>.

Sensor Switch, nLight Lighting Control System, [online], [retrieved on Jan. 11, 2008] Retrieved from Sensor Switch web page using Internet <URL: http://www.sensorswitch.com>.

Six Strategies, [online], [retrieved on Jan. 11, 2008] Retrieved from Encelium Technologies Inc. Web Page using Internet <URL: http://www.encelium.com/products/strategies.html>.

Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.

Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr . . . >.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.

PLC-96973-PC PLC Lighting Elegance Modern/Contemporary Pendant Light, [online], [retrieved on Feb. 27, 2009] Retrieved from the Arcadian Lighting Web Page using Internet <URL: http/www.arcadianlighting.com/plc-96978-pc.html>.

PLC-81756-AL “Fireball” Contemporary Pendant Light, [online], [retrieved on Feb. 27, 2009] Retrieved from the Arcadian Lighting Web Page using Internet <URL: http://www.arcadianlighting .com/plc-81756-al.html>.

Philips. Sense and Simplicity—Licensing program for LED Luminaires and Retrofits, Philips Intellectual Property & Standards, May 5, 2009.

International Search Report and Written Opinion dated Jul. 17, 2009 from the corresponding International Application No. PCT/US2008/085118 filed Dec. 1, 2008.

International Search Report and Written Opinion dated Aug. 25, 2009 from corresponding International Application No. PCT/US2009/031049 filed Jan. 15, 2009.

International Search Report and Written Opinion dated Jan. 4, 2010 from the corresponding International Application No. PCT/US2009/044313 filed May 18, 2009.

International Search Report and Written Opinion dated Jan. 25, 2010 from the corresponding International Application No. PCT/US2009/048623 filed Jun. 25, 2009.

International Search Report and Written Opinion dated Feb. 26, 2010 from the corresponding International Application No. PCT/US2009/050949 filed Jul. 17, 2009.

International Search Report and Written Opinion dated Mar. 22, 2010 from the corresponding International Application No. PCT/US2009/053853 filed Aug. 14, 2009.

International Search Report and Written Opinion dated May 14, 2010 from the corresponding International Application No. PCT/US2009/060085 filed Oct. 9, 2009.

International Search Report and Written Opinion dated May 24, 2010 from the corresponding International Application No. PCT/US2009/060087 filed Oct. 9, 2009.
International Search Report and Written Opinion dated May 24, 2010 from the corresponding International Application No. PCT/2009/060083 filed Oct. 9, 2009.
International Search Report and Written Opinion dated Jul. 16, 2009 from the corresponding International Application No. PCT/US2008/084650 filed Nov. 25, 2008.
International Search Report and Written Opinion dated Feb. 8, 2011 from the corresponding International Application No. PCT/US2010/039608 filed Jun. 23, 2010.
International Search Report and Written Opinion dated Dec. 24, 2010 from the corresponding International Application No. PCT/US2010/034635 filed May 13, 2010.
International Search Report and Written Opinion dated Feb. 7, 2011 from the corresponding International Application No. PCT/US2010/039678 filed Jun. 23, 2010.
International Search Report and Written Opinion dated Dec. 13, 2010 from the corresponding International Application No. PCT/US2010/037006 filed Jun. 2, 2010.
LCD Optics 101 Tutorial [online]. 3M Corporation, [retrieved on Jan. 6, 2010]. Retrieved from the internet: <URL: http://solutions.3m.com/wps/porta1/3M/en_US/Vikuiti1/BrandProducts/secondary/optics101/>.
International Search Report and Written Opinion dated Jul. 30, 2010 from the corresponding International Application No. PCT/US2010/021448 filed on Jan. 20, 2010.
International Search Report and Written Opinion dated Aug. 16, 2010 from the corresponding International Application No. PCT/US2010/021131 filed on Jan. 15, 2010.
International Search Report and Written Opinion dated May 7, 2010 from the corresponding International Application No. PCT/US2009/057109 filed on Sep. 16, 2009.
International Search Report and Written Opinion dated Apr. 30, 2010 from the corresponding International Application No. PCT/US2009/057072 filed on Sep. 16, 2009.
International Search Report and Written Opinion dated Aug. 17, 2010 from the corresponding International Application No. PCT/US2010/021489 filed on Jan. 20, 2010.
International Search Report and Written Opinion dated Apr. 8, 2010 from the corresponding International Application No. PCT/2009/055114 filed on Aug. 27, 2009.

LED BULB WITH INTERNAL HEAT DISSIPATING STRUCTURES

CROSS REFERENCE TO RELATED APPLICATION

This application claims priority to U.S. Provisional Patent Application No. 61/317,871, filed Mar. 26, 2010, which is incorporated herein by reference in its entirety.

TECHNICAL FIELD

The invention relates to a light emitting diode (LED) based light, for example, an LED-based light bulb usable in an Edison-type fixture in place of a conventional incandescent bulb.

BACKGROUND

Incandescent light bulbs are commonly used in many environments, such as households, commercial buildings, and advertisement lighting, and in many types of fixtures, such as desk lamps and overhead fixtures. Incandescent bulbs can each have a threaded electrical connector for use in Edison-type fixtures, though incandescent bulbs can include other types of electrical connectors such as a bayonet connector or pin connector. Incandescent light bulbs generally consume large amounts of energy and have short life-spans. Indeed, many countries have begun phasing out or plan to phase out the use of incandescent light bulbs entirely.

Compact fluorescent light bulbs (CFLs) are gaining popularity as replacements for incandescent light bulbs. CFLs are typically much more energy efficient than incandescent light bulbs, and CFLs typically have much longer life-spans than incandescent light bulbs. However, CFLs contain mercury, a toxic chemical, which makes disposal of CFLs difficult. Additionally, CFLs require a momentary start-up period before producing light, and many consumers do not find CFLs to produce light of similar quality to incandescent bulbs. Further, CFLs are often larger than incandescent lights of similar luminosity, and some consumers find CFLs unsightly when not lit.

Known LED-based light bulbs have been developed as an alternative to both incandescent light bulbs and CFLs. Known LED light bulbs typically each include a base that functions as a heat sink and has an electrical connector at one end, a group of LEDs attached to the base, and a bulb. The bulb often has a semi-circular shape with its widest portion attached to the base such that the bulb protects the LEDs.

SUMMARY

Known LED-based light bulbs suffer from multiple drawbacks. A base of a typical known LED-based light bulb is unable to dissipate a large amount of heat, which in turn limits the amount of power that can be supplied to LEDs in the typical known LED-based light bulb without a high risk of the LEDs overheating. As a result of the power supplied to the LEDs being limited, the typical known LED-based light bulb has a limited luminosity and cannot provide as much light as an incandescent light bulb that the LED-based light bulb is intended to replace.

In an effort to increase the luminosity of known LED-based light bulbs, some known LED-based light bulbs include over-sized bases having large surface areas. The large surface areas of the over-sized bases are intended to allow the bases to dissipate sufficient amounts of heat such that the LEDs of each known LED-based light can be provided with enough power to produce in the aggregate as much luminosity as the respective incandescent bulbs that the LED-based light bulbs are intended to replace. However, the total size of one of the LED-based lights is often limited, such as due to a fixture size constraint. For example, a desk lamp may only be able to accept a bulb having a three to four inch diameter, in which case the over-sized base of an LED-based light should not exceed three to four inches in diameter. Thus, the size of the over-sized base for the known LED-based light bulb is constrained, and heat dissipation remains problematic.

Further, the use of over-sized bases in some known LED-based light bulbs detracts from the distributions of light emanating from the bulbs. That is, for a typical known LED-based light bulb having one of the over-sized bases, the over-sized base has a diameter as large as or larger than a maximum diameter of the bulb of the known LED-based light bulb. As a result of its small bulb diameter to base diameter ratio, the base blocks light that has been reflected by the bulb and would otherwise travel in a direction toward an electrical connector at an end of the base. The typical known LED-based light bulb thus does not direct much light in a direction toward the electrical connector. For example, when the typical known LED-based light bulb having an over-sized base is installed in a lamp or other fixture in which the bulb is oriented with its base below its bulb, very little light is directed downward. Thus, the use of over-sized bases can also prevent known LED-based lights from closely replicating the light distribution of incandescent bulbs.

In addition to using over-sized bases, other attempts have been made to increase the ability of known LED-based light bulbs to dissipate heat. For example, bases of some known LED-based light bulbs include motorized fans for increasing the amounts of airflow experienced by the bases. However, known LED-based light bulbs including fans often produce audible noise and are expensive to produce. As another example, bases of known LED-based lights have been provided with axially extending ribs in an attempt to increase the surface areas of the bases without too greatly increasing the diameters of the bases. However, such ribs often have the effect of acting as a barrier to air flow and, as a result, tend to stall air flow relative to the base. As a result, bases with ribs typically do not provide a sufficient amount of heat dissipation. As yet another example, fluid fill LED-based lights have been introduced, with the fluid intended to efficiently transfer heat from LEDs to outside shells of the lamps. However, these lamps are at risk for leaking or spilling their fluid, and allowance must be made for thermal expansion of the fluid, thereby reducing the heat-transferring ability of the lamps.

Examples of "inside-out" LED-based bulbs described herein can have advantages over known LED-based light bulbs. For example, an example of an inside-out LED-based bulb can include a base. The base can include a physical and/or electrical connector on one of its ends, and the base can define a compartment that can contain electronics such as a power converter and/or any other electronics in electric communication with the electrical connector. One or more LEDs can be mounted on an opposing end of the base and if more than one LED is included the LEDs can be mounted on an annular circuit board that is in electrical communication with the electronics. An annular light pipe can be positioned over the LEDs such that light produced by the LEDs enters the light pipe. High-surface area heat dissipating structures, such as fins or pins, can extend from the base through a cavity defined by the annular light pipe. A thermal shroud can be positioned over distal ends of the heat dissipating structures to protect against, as an example, inadvertent contact of a hand with one or more of the heat dissipating structures. An additional group of LEDs can optionally be mounted on a distal end of the heat dissipating structures interior of the thermal shroud. Other inside-out LED-based bulb configurations are also described herein.

In operation, the inside-out LED-based bulb can be engaged with a conventional fixture designed to receive, for example, an incandescent bulb. When powered, the electronics of the LED-based bulb can convert power received from the fixture via the electrical connector to a type of power suitable for the LEDs, and that power can be transferred to the LEDs via the circuit board. As such, the LEDs can produce light, and that light can enter the light pipe, which can in turn distribute the light in a manner closely replicating an incandescent bulb. Moreover, heat produced by the LEDs can pass to the base via the circuit board, and from the base to the heat dissipating structures. The surface area of the heat dissipating structures can be large enough to dissipate a sufficient amount of heat to allow the LEDs to use an amount of power sufficient for the LEDs to replicate an incandescent bulb. Additionally, as a result of the location of the heat dissipating structures—inside the cavity defined by the annular light pipe—the structures do not interfere with the distribution of light. Thus, inside-out LED-based lights as described herein can each produce a sufficient amount of light to replicate incandescent bulbs without overheating because of their heat dissipating ability, and the lights can produce that light in a distribution closely replicating an incandescent bulb because a large light blocking base acting as a heat sink can be avoided.

One aspect of an "inside-out" LED based light comprises a base having a first end and a second end and a light structure adjacent to the base and extending along a longitudinal axis of the light. The light structure includes an inner surface and an outer surface and defines a cavity. A heat dissipating structure extends into the cavity and at least one LED is mounted in thermally conductive relation to the heat dissipating structure.

In another aspect of an LED based light for replacing a conventional incandescent light bulb, the LED based light comprises a connector configured to provide a physical connection to a conventional incandescent light fixture, at least one LED and a light pipe having an inner surface and an outer surface and extending along a longitudinal axis of the light to define a cavity radially inward of the inner surface. The light pipe is optically configured to receive a light emitted by the at least one LED and to distribute substantially all of the received light radially outward from the light pipe in a predetermined light distribution. A heat dissipating structure is in thermally conductive relation to the at least one LED and extending into the cavity.

Also disclosed are methods of making an LED based light. One method comprises providing a base having a first end and a second end, mounting a light structure having an inner surface and an outer surface and defining a cavity adjacent to the base so that the light structure extends along a longitudinal axis of the light, providing a heat dissipating structure within the cavity and mounting at least one LED in thermally conductive relation to the heat dissipating structure.

BRIEF DESCRIPTION OF THE DRAWINGS

The description herein makes reference to the accompanying drawings wherein like reference numerals refer to like parts throughout the several views, and wherein.

DESCRIPTION

Figure 1:
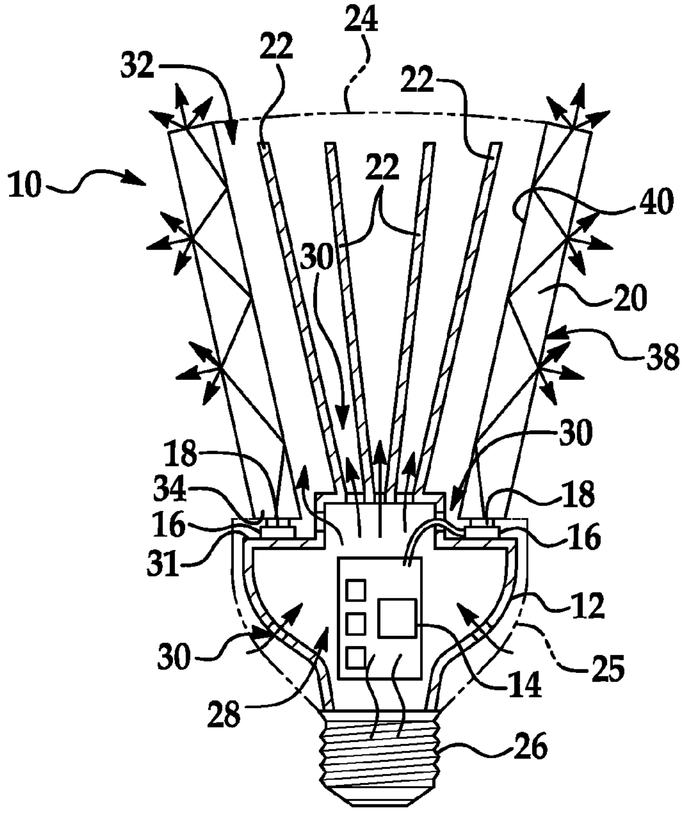
FIG. 1 is a cross sectional view of an example of an inside-out LED-based bulb taken along a longitudinal axis of the LED-based bulb.
Figure 3:
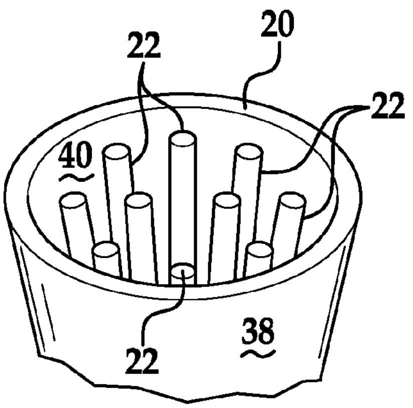
FIG. 3 is a partial perspective view of the bulb of FIG. 1.
Figure 4:
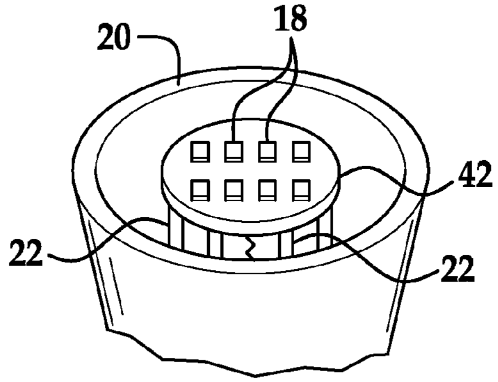
FIG. 4 is a partial perspective view of another example of an inside-out LED-based bulb.
Figure 5:
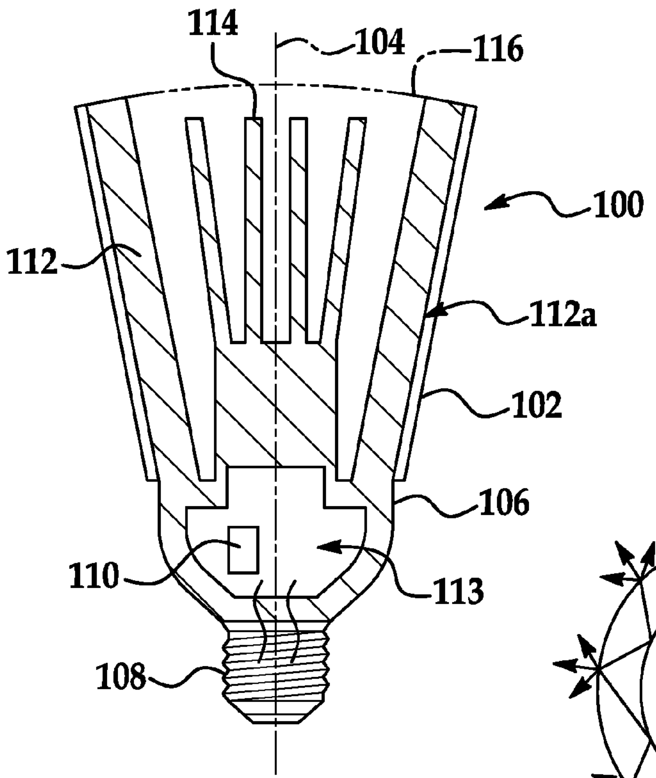
FIG. 5 is a cross sectional view of a yet another example of an inside-out LED-based bulb taken along a longitudinal axis of the LED-based bulb.

Examples of inside-out LED-based bulbs are discussed herein with reference to FIGS. 1-11. The bulbs are referred to as being "inside-out" because the bulbs can include heat dissipating structures located radially inward of a light source, such as a light pipe, relative to longitudinal axes of the bulbs. (An example of a longitudinal axis 104 is shown in FIG. 5, and the term radial refers to a direction orthogonal to a longitudinal axis unless otherwise indicated.) A first example of an inside-out LED-based bulb 10 in FIG. 1 is configured to replace a conventional incandescent light bulb in a conventional fixture, such as an Edison-type fixture. Alternatively, the bulb 10 can be configured to replace another type of bulb. The bulb 10 can include a base 12 that houses electronics 14, a circuit board 16, a plurality of LEDs 18, a light pipe 20, heat dissipating structures 22 and thermal shrouds 24 and 25.

One end of the base 12 can include an electrical connector 26. The electrical connector 26 as illustrated is of the Edison-type, although the base can alternatively include another type of electrical connector 26 such a bi-pin or bayonet type connector. The type of connector 26 can depend on the type of fixture that the bulb 10 is designed to be engaged with. In addition to providing an electrical connection between the bulb 10 and the fixture, the connector 26 can also serve to physically connect the bulb 10 to the fixture. For example, by screwing the connector 26 into engagement with an Edison-type fixture, the bulb 10 is both physically and electrically connected to the fixture. Additionally, the connector 26 can be in electrical communication with the electronics 14. For example, electrically conductive wires can link the connector 26 and electronics 14. The connector 26 can be snap-fit, adhered, or otherwise fixed to a remainder of the base 12. The base 12 can be constructed from a highly thermally conductive material, such as aluminum, another metal, or a highly thermally conductive polymer. The base 12 can be painted, powder-coated, or anodized to improve its thermal emissivity. For example, a thermally conductive, high emissivity paint (e.g., a paint having an emissivity of greater than 0.5) can be applied to at least a portion of an exterior of the base 12.

The base 12 can be hollow so as to define a compartment 28 large enough to receive electronics 14. The electronics 14 can include, as an example, power conversion electronics (e.g., a rectifier, a filtering capacitor, and/or DC to DC conversion circuitry) for modifying power receive from the connector 26 to power suitable for transmission to the circuit board 16. By forming the connector 26 separately from the remainder of the base 12 as mentioned above, the base 12 not including the connector 26 can define an opening for installation of the electronics 14. The opening in the base 12 can then be sealed when the connector 26 is fixed to the base 12.

The base 12 can define various apertures 30. The apertures 30 can be at one or more of a variety of locations, such as along the base 12 between connector 26 and the circuit board 16, adjacent and radially inward of the circuit board 16, and adjacent the heat dissipating structures 22. Each aperture 30 can provide a path of airflow between the compartment 28 and an ambient environment external the base 12. As a result, the apertures 30 can allow airflow between the compartment 28 and the ambient environment external the base 12, thereby facilitating heat transfer from the base 12 and electronics 14 to the ambient environment. Additionally, an electrical connection between the electronics 14 and circuit board 16 can pass through one or more of the apertures 30.

The base 12 can additionally define an annular platform 31. The platform 31 can be generally planar. The circuit board 16 can be annular and can be mounted on the platform 31. For example, the circuit board 16 can be attached to the platform 31 using thermally conductive tape or in another manner, such as using an adhesive or a snap-fit connection. The circuit board 16 can be electrically connected to the electronics 14, such as by way of electrically conductive wires extending through one or more of the apertures 30 and linking the circuit board 16 to the electronics 14.

The circuit board 16 can be an annular printed circuit board. Additionally, the circuit board 16 can be formed of multiple discrete circuit board sections, which can be electrically connected to one another using, for example, bridge connectors. For example, the circuit board 16 can be formed of multiple rectangular circuit boards arranged about the platform 31. Also, other types of circuit boards may be used, such as a metal core circuit board. Or, instead of a circuit board 16, other types of electrical connections (e.g., wires) can be used to electrically connect the LEDs 18 to each other and/or the electronics 14.

The LEDs 18 can be mounted on the circuit board 16 and in electrical communication therewith. As such, the LEDs 18 can be arranged in an annular configuration with the heat dissipating structures 22 extending from the base 12 radially inward of the LEDs 18. The LEDs 18 can be spaced at even intervals around the platform 31, although the LEDs 18 can alternatively be arranged in another fashion, such as in a pattern of two or more circles having different diameters. The LEDs 18 can be surface-mount devices of a type available from Nichia, though other types of LEDs can alternatively be used. For example, although surface-mounted LEDs 18 are shown, one or more organic LEDs can be used in place of or in addition thereto. Each LED 18 can include a single diode or multiple diodes, such as a package of diodes producing light that appears to an ordinary observer as coming from a single source. The LEDs 18 can be mounted on and electrically connected to the circuit board 16 using, for example, solder or another type of connection. The LEDs 18 can emit white light. However, LEDs that emit blue light, ultra-violet light or other wavelengths of light can be used in place of white light emitting LEDs 18.

The number and power level of the LEDs 18 can be selected such that the bulb 10 can produce a similar amount of luminosity as a conventional incandescent bulb that the bulb 10 is intended to be a substitute for. For example, if the bulb 10 is intended as a substitute for a 60 W incandescent bulb, the LEDs 18 in the aggregate can require 8-15 W of power, although this power level may change as LED technology improves. If the bulb 10 is intended to replicate another type of bulb, the LEDs 18 can output a different amount of light. The LEDs 18 can be oriented to face parallel to the longitudinal axis of the bulb 10, although the LEDs 18 can alternatively be oriented at an angle to the illustrated position.

Figure 2:
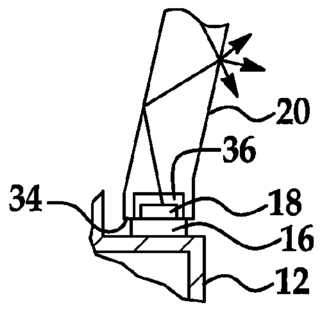
FIG. 2 is a blown-up view of a region of FIG. 1 including an LED and a proximal end of a light pipe.

The light pipe 20 can have a generally annular shape, and the light pipe 20 can define a cavity 32 radially inward of the light pipe 20. The light pipe 20 can be positioned to receive light produced by the LEDs 18. For example, the light pipe 20 can have an annular-shaped proximal end 34 that defines an annular cutaway 36 sized to receive the LEDs 18 as shown in FIG. 2. The cutaway 36 can be continuous and annular shaped, or can have an alternative shape such as a plurality of circumferentially spaced discrete indentations spaced in accordance with spacing of the LEDs 18. The light pipe 20 can be positioned such that the LEDs 16 are received in the cutaway 36. Alternatively, the proximal end 34 can be planar and positioned against or slightly above the LEDs 18 with reference to the orientation shown in FIG. 1. As another alternative, if the light pipe 20 is hollow, the proximal end 34 can be an opening between radially spaced sidewalls of the light pipe 20. The light pipe 20 can be attached to the base 12 and/or the circuit board 14. For example, the light pipe 20 can be adhered or snap-fit to the base 12. Moreover, the light pipe 20 can be attached to the base radially outward of the circuit board 14 such that the base 12 and light pipe 20 effectively seal off the circuit board 14.

Figure 6:
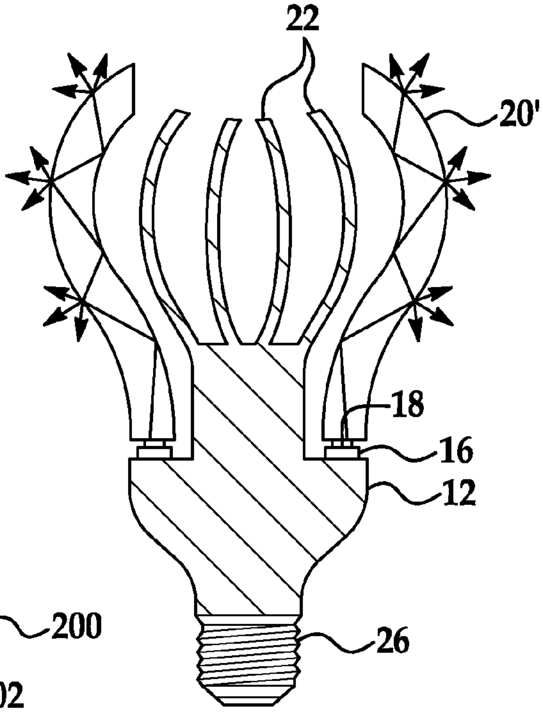
FIG. 6 is a cross sectional view of a still yet another example of an inside-out LED-based bulb taken along a longitudinal axis of the LED-based bulb.

The light pipe 20 can be optically configured to direct light produced by the LEDs 16 that enters the light pipe 20 in a distribution that appears to an ordinary observer to replicate the incandescent bulb which the bulb 10 is a substitute for, although the light pipe 20 can produce an alternative distribution of light depending on its configuration. Experimentation, a computational model or other means can be used to determine the specific shape of the light pipe 20 in order to achieve a certain light distribution. While the light pipe 20 shown in FIG. 1 has a conical shape including a linear outer radial surface 38 and a linear inner radial surface 40, both of which extend radially outward as the light pipe 20 extends away from the base 12, the light pipe 20 can have other shapes. For example, FIG. 6 shows a light pipe 20' having a bulbous profile similar to a conventional incandescent bulb. The bulbous profile of the light pipe 20' can have a more familiar appearance for consumers. Additionally, the light pipe 20' can provide a different light distribution than the light pipe 20, with the light pipe 20' distributing a greater amount of light in a longitudinal direction.

The shape of the light pipe 20 can be designed such that, as an example, the inner radial surface 40 causes total internal reflection of most light that contacts the surface 40, thereby reducing or eliminating the amount of light that enters the cavity 32. In addition to shaping the light pipe 20 to achieve a certain light distribution, other means for achieving a certain light distribution can also be used as discussed below with reference to FIG. 9. The light pipe 20 can be hollow or solid between surfaces 38 and 40.

The heat dissipating structures 22 can extend away from the base 12 within the cavity 32 defined by the light pipe 20, and the heat dissipating structures 22 can be in thermal communication with the base 12, including the platform 31. As such, the heat dissipating structures 22 can be in thermal communication with the LEDs 18 via the circuit board 16. The structures 22 can be made from highly thermally conductive material, such as aluminum, another metal, or a highly thermally conductive plastic. The shape of the structures 22 can provide a high surface area to volume ratio, or otherwise be designed to aid heat dissipation. For example, the structures 22 can be pins as shown in FIG. 3, fins, concentric conical shapes of varying diameters, a lattice-type structure, or any other heat-sink type shape. The heat dissipating structures 22 can be integrally formed with the base 12 (e.g., via machining or casting), or formed separately and attached thereto.

The shrouds 24 and 25 can protect against accidental contact with the bulb 10. For example, the shrouds 24 and 25 can be formed of thermally insulating materials (e.g., plastic) and spaced from the base 12 and heat dissipating structures 22, respectively, so as to remain at a relatively cool temperature regardless of the temperatures of the base 12 and/or the heat dissipating structures 22. The shroud 24 can extend over a distal end of the cavity 32 and can be attached to the light pipe 20. For example, the shroud 24 can be attached to the inner radial surface 40 of the light pipe 20 adjacent the distal end of the light pipe 20 opposite the platform 31 so as not to block any light passing through the distal end of the light pipe 20. The shroud 24 can be adhered to the light pipe 20 or attached in another manner (e.g., the shroud 24 can be integrally formed with the light pipe 20). The shroud 24 can include apertures to facilitate airflow between the cavity 32 and the ambient environment, or the shroud can be solid 24. The shroud 24 can protect against inadvertent contact with the heat dissipating structures 22, which may become hot during usage of the bulb 10. Similarly, the shroud 25 can cover the base 12, and can also cover a junction between the light pipe 20 and base 12. The shroud 25 can protect against inadvertent contact with the base 12.

In operation, the bulb 10 can be installed in a conventional fixture, such as an Edison-type fixture in a lamp, ceiling or other location. Electricity can be supplied to the bulb 10 via the connector 26, and the electricity can pass to the electronics 14. The electronics 14 can convert the electricity to a form acceptable for the LEDs 18, and the converted electricity can pass to the circuit board 16 and, in turn, the LEDs 18. In response, the LEDs 18 can produce light. The light can enter the light pipe 20, which can distribute the light to replicate a conventional incandescent bulb or some other predetermined pattern. Heat produced by the LEDs 18 during operation can pass through the circuit board 16 to the base 12, and from the base 12 to the ambient environment and to the heat dissipating structures 22. The heat dissipating structures 22 can dissipate heat into the cavity 32. Heat in the cavity 32 can reach the ambient environment by dissipating across or through apertures in the shroud 24. As a result of the heat dissipation abilities of the base 12 and its heat dissipating structures 22, the LEDs 18 can produce a sufficient amount of light to replace an incandescent bulb or another type of light without overheating. Further, the light pipe 20 can distribute that light in a manner replicating the even distribution of the incandescent bulb, although other distributions are also possible.

In another example shown in FIG. 4, the LED-based bulb 10 can include a second circuit board 42 atop the heat dissipating structures 22 and having LEDs 18 mounted thereon. The second circuit board 42 and its LEDs 18 can supplement or act as a substitute for light passing out the distal end of the light pipe 20. The second circuit board 42 can be attached to the heat dissipating structures 22 using, as an example, thermally conductive tape or an adhesive, and the board 42 can be electrically connected to the electronics 14 or the circuit board 16 using electrically conductive wires that extend through the cavity 32. If the shroud 24 is used, the shroud 24 can be formed of a light transmitting material.

Another example of an inside-out LED-based bulb 100 shown in FIG. 5 includes organic LEDs (also known as OLEDs) 102. The bulb 100 can include a base 106 having an electrical connector 108 and housing electronics 110 in a cavity 113 similar to as described above in respect of the base 12, its connector 26 and electronics 14. The OLEDs 102 can be in electrical communication with the electronics 110 for receiving power received by the connector 108. The base 106 can have a conical flange 112, and the OLEDs 102 can be attached to an outer radial surface **112*a* the conical flange 112 such that the OLEDs 102 extend circumferentially about the flange 112. The OLEDs 102 can be attached to the flange 112 using, as example, adhesive or thermally conductive tape. The base 106 can additionally include heat dissipating structures 114, such as pins, fins, a lattice-type structure, a series of concentric conical extensions, or other high surface area to volume shapes, radially inward of the OLEDs 102 and the flange 112. The flange 112 and structures 114 can be in thermal communication such that the structures 114 can aid in dissipating heat transferred from the OLEDs 102 to the flange 112. A thermal shroud 116 can extend over the flange 112 to cover the flange and structures 114, and the shroud 116 can have the same configuration as the shroud 24 discussed above with respect to FIG. 1**.

Note that the OLEDs 102 need not extend continuously about the entire surface of the exterior surface **112*a* of the flange 112, and can instead, as an example, be circumferentially or longitudinally spaced from one another. Alternatively, a single OLED 102 can be wrapped around the flange 112. Additionally, another OLED or LED can be attached to a distal end of the heat dissipating the flange 112 and/or structures 114 for producing light along the axis 104. Also, the flange 112 can be formed of multiple discrete, circumferentially spaced flange portions or can have an alternative structure for supporting OLEDs 102** and receiving heat therefrom.

In operation, as a result of being attached to the flange 112 the OLEDs 102 are in thermal communication with the flange 112 and heat produced by the OLEDs 102 during operation can be communicated to the base 106. The OLEDs 102 can produce light radially outward from the axis 104 in a distribution replicating an incandescent bulb. Further, since heat can be effectively dissipated from the OLEDs 102 by the flange 112 and heat dissipating structures 114, the OLEDs 102 can operate at a sufficiently high power to produce a similar amount of light as an incandescent bulb without overheating.

Figure 7:
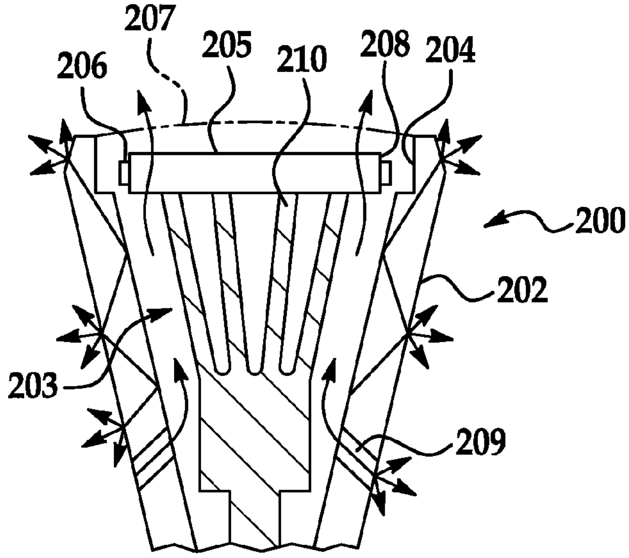
FIG. 7 is a cross sectional view of a portion of a further example of an inside-out LED-based bulb taken along a longitudinal axis of the LED-based bulb.

FIG. 7 shows another example of an inside-out of an inside-out LED-based bulb 200. The bulb 200 includes a conical light pipe 202 having a light receiving portion 204 along a radial interior of a distal end of the light pipe 202 (relative to a base not shown in FIG. 7). Alternatively, the light receiving portion 204 can have a different location, such as spaced more toward a proximal end of the light pipe 202. The light receiving portion 204 can extend circumferentially about the entire light pipe 202 or can be comprised of a series of light receiving portions. Heat dissipating structures 210, such as pins, fins, or at lattice structure, can extend from a base toward a distal end of the light pipe 202 within a cavity 203 defined by the light pipe 202. A disk 205 of thermally conductive material can be positioned atop the heat dissipating structures 210 for thermal communication therewith. LEDs 206 can be positioned on an outer radial side 208 of disk 205. For example, the LEDs 206 can be mounted on an annular circuit board attached to the disk 205 and in electrical communication with a connector of the bulb 200. The LEDs 206 can face the light receiving portion 204 such that light produced by the LEDs 206 enters the light pipe 202 and can be distributed to replicate the distribution of light provided by, for example, an incandescent bulb. Alternatively, if no disk 205 is included, the LEDs 206 can be attached to distal ends of the heat dissipating structures 210. A thermally protective shroud 207 can span the cavity 203 to protect against, for example, in advertent contact with the disk 205 and/or LEDs 206, and the shroud 207 can include apertures for allowing air flow between the cavity 203 and ambient environment external the bulb 200.

In operation, the LEDs 206 can receive power from a fixture via any electronics included in a base of the bulb 200 and any circuit board on which the LEDs 206 are mounted. The LEDs 206 can produce light in response to receiving power, and that light can enter the light pipe 202. The light pipe 202 can distribute the light longitudinally and radially to replicate, for example, a conventional incandescent bulb. Heat produced by the LEDs 206 during operation can be communicated to the disk 205, from the disk 205 to the heat dissipating structures 210, and from the heat dissipating structures 210 to air in the cavity 203. The air in the cavity 203 can circulate with air in the ambient environment via, as example, apertures in the shroud 207 and apertures 209 formed in the light pipe 202. Thus, the LEDs 206 can be cooled to a sufficient extent that the LEDs 206 in the aggregate can produce enough light to replicate, as an example, an incandescent bulb.

Figure 8:
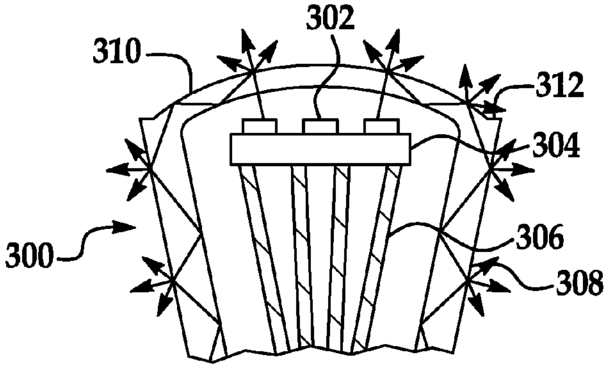
FIG. 8 is a cross sectional view of a portion of still a further example of an inside-out LED-based bulb taken along a longitudinal axis of the LED-based bulb.

Still another example of an inside-out LED-based bulb 300 is shown in FIG. 8. In this example, LEDs 302 are positioned on a circuit board 304 atop heat dissipating structures 306 similar to as explained with respect to FIG. 4. However, in this example, a light pipe 308 includes a domed-portion 310 spanning a distal end 312 of the light pipe 308. Additional LEDs can operationally be included to produce light that enters a proximal end of the light pipe as explained with respect to FIG. 1. The domed-portion 310 can act as a lens to distribute light produced by the LEDs 302 in a predetermined pattern, such as a pattern having the appearance of light produced by the distal end of a conventional incandescent bulb. Alternatively, the domed-portion 310 can act as light pipe allowing some light to exit a distal end of the bulb 300 and guiding some light toward a proximal end of the light pipe 308.

Figure 9:
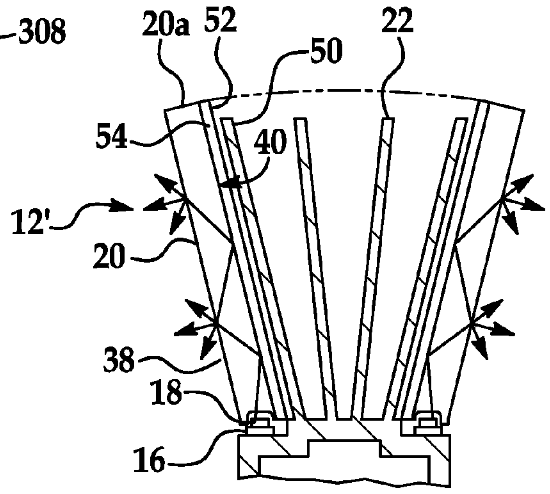
FIG. 9 is a cross sectional view of a portion of yet a further example of an inside-out LED-based bulb taken along a longitudinal axis of the LED-based bulb.

As shown in FIG. 9, another example of a base 12' is shown in conjunction with the circuit board 16, LEDs 18 and light pipe 20 from FIG. 1. In addition to including heat dissipating structures 22 spaced radially inward from the light pipe 20, the base 12' includes a flange 50 in thermal contact with the inner radial surface 40 of the light pipe 20. Thermal paste 52 can be applied at a junction between the inner radial surface 40 and the flange 50 to facilitate heat transfer from the light pipe 20 to the flange 50. Additionally, a reflector 54, such as reflective paint or a mirrored insert, can be applied to the inner radial surface 40 to ensure that all or nearly all light exits the our radial surface 38 or the distal end 20*a* of the light pipe 20. Additionally, the light pipe 20 can be modified in other manners to obtain a predetermined light distribution. For example, a layer of diffusive material can be applied over the outer radial surface 38 and/or the distal end 20*a* of light pipe 20, or the light pipe 20 can include surface roughening or other light diffracting structures along one or both of the surface 38 distal end 20*a* of the light pipe 20. Moreover, the treatment of the light pipe 20 can vary over its longitudinal dimension. For example, light diffracting structures can become more dense nearer the distal end 20*a* of the light pipe 20.

Figure 10:
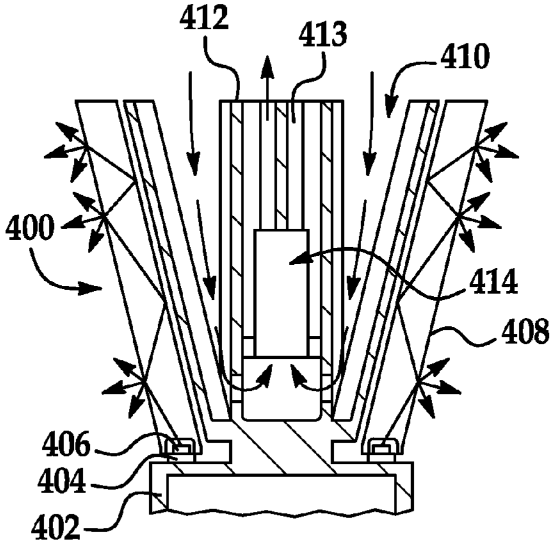
FIG. 10 is a cross sectional view of a portion of an additional example of an inside-out LED-based bulb taken along a longitudinal axis of the LED-based bulb.
Figure 11:
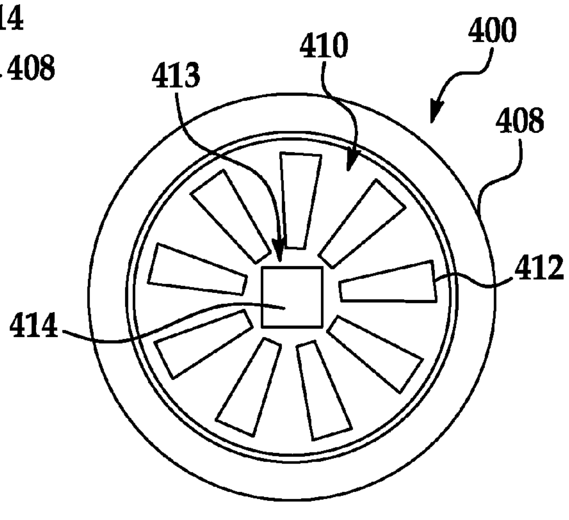
FIG. 11 is a top plan view of the bulb of FIG. 10.

In addition to facilitating heat transfer via the inclusion of the heat transferring structures, other example of an inside-out LED-based bulb can have active heat dissipating devices. For example, FIGS. 10 and 11 show an example of an LED-based bulb 400 including a base 402, an annular circuit board 404 having LEDs 406 mounted thereon, and an annular light pipe 408 that receives light produced by the LEDs 406 and defines a cavity 410 radially inward of the light pipe 408. Heat dissipating structures 412, such as pins, fins, or a lattice structure, can be disposed in the cavity 410. Additionally, a piezo-driven fan 414 can be disposed in the cavity 410. For example the heat dissipating structures 412 can define an open channel 413, and the fan 414 can be disposed in the channel 413 and supported by supported by adjacent heat dissipating structures 412. The fan 414 can be operable in response its temperature becoming elevating to produce an airflow. Thus, the fan 414 can facilitate convective heat transfer from the heat dissipating structures 412 to an ambient environment about the bulb 400 without using any electricity. Alternatively, the piezo-driven fan 414 can be disposed at a different location, such as underlying the heat dissipating structures 412.

The above-described examples have been described in order to allow easy understanding of the invention and do not limit the invention. On the contrary, the invention is intended to cover various modifications and equivalent arrangements, whose scope is to be accorded the broadest interpretation so as to encompass all such modifications and equivalent structure as is permitted under the law.

The invention claimed is:

1. An LED based light comprising:
a base having a first end and a second end;
a light structure adjacent to the base and extending along a longitudinal axis of the light;
wherein the light structure includes an inner surface and an outer surface and defines a cavity;
a heat dissipating structure extending into the cavity; and
at least one LED mounted in thermally conductive relation to the heat dissipating structure;
wherein:
the light structure is an annular flange;
the at least one LED includes at least one organic LED; and
the at least one organic LED is mounted to the outer surface and arranged to emit light in a predetermined light distribution.

2. The LED based light of claim 1 wherein the predetermined light distribution is the light distribution of a conventional incandescent bulb.

3. An LED based light comprising:
a base having a first end and a second end;
a light structure adjacent to the base and extending along a longitudinal axis of the light;
wherein the light structure includes an inner surface and an outer surface and defines a cavity;
a heat dissipating structure extending into the cavity; and
at least one LED mounted in thermally conductive relation to the heat dissipating structure;
wherein:
the light structure is a light pipe having a proximal end opposing a distal end;
the inner surface is configured for substantially total internal reflection of light; and the light pipe is configured to distribute a light produced by the at least one LED in a predetermined light distribution.

4. The LED based light of claim 3 further comprising a connector fixed to the first end of the base and configured to provide a physical connection to a conventional incandescent light fixture.

5. The LED based light of claim 4 further comprising electronics, wherein:

the base defines a compartment;

the electronics are disposed within the compartment;

the connector is further configured to provide an electrical connection to the conventional incandescent light fixture;

the electronics are in electrical communication with the connector and configured to receive a power from a conventional incandescent light fixture through the connector;

the electronics are in electrical communication with the at least one LED; and the electronics are configured to supply a power suitable for transmission to the at least one LED.

6. The LED based light of claim 5 wherein the base includes a plurality of apertures configured to allow airflow between the compartment and an ambient environment external to the base.

7. The LED based light of claim 3 wherein the predetermined light distribution is the light distribution of a conventional incandescent bulb.

8. The LED based light of claim 3 wherein:

the heat dissipating structure extends from the base;

the base is made from a thermally conductive material; and the at least one LED includes a first group of LEDs mounted in thermally conductive relation to the base.

9. The LED based light of claim 8 wherein:

the second end defines an annular platform;

an annular circuit board is mounted on the annular platform;

the first group of LEDs is mounted on and in electrical communication with the annular circuit board; and the first group of LEDs is oriented to face substantially parallel to the longitudinal axis of the light.

10. The LED based light of claim 3 wherein:

the at least one LED includes a first LED disposed adjacent to the second end of the base;

the proximal end of the light pipe includes a proximal light receiving portion optically configured to receive a light produced by the first LED.

11. The LED based light of claim 10 wherein:

the light pipe is an annular light pipe;

the annular light pipe is solid between the inner surface and outer surface; and the proximal light receiving portion defines an annular cutaway sized to receive the first LED.

12. The LED based light of claim 10 wherein:

the at least one LED includes a second LED oriented to face the inner surface; and the inner surface includes an interior light receiving portion optically configured to receive a light produced by the second LED.

13. The LED based light of claim 3 wherein:

the heat dissipating structure is made from highly thermally conductive material; and the heat dissipating structure has a high surface area to volume ratio.

14. The LED based light of claim 13 wherein the heat dissipating structure is at least one of a plurality of longitudinally extending pins or a plurality of longitudinally extending fins.

15. The LED based light of claim 3 further comprising an active heat dissipating device disposed within the cavity.

16. The LED based light of claim 3 further comprising a first thermal insulating shroud disposed about the base.

17. The LED based light of claim 16 further comprising a second thermal insulating shroud, wherein:

the second thermal insulating shroud extends over the distal end of the light structure to enclose the heat dissipating structure; and at least one of the light structure or the second thermal insulating shroud includes a plurality of apertures configured to allow airflow between the cavity and an ambient environment external to the light structure.

18. A method making an LED based light comprising:

providing a base having a first end and a second end;

mounting a light structure having an inner surface and an outer surface and defining a cavity adjacent to the base so that the light structure extends along a longitudinal axis of the light, wherein the light structure is an annular flange;

providing a heat dissipating structure within the cavity;

mounting at least one LED in thermally conductive relation to the heat dissipating structure;

mounting the annular flange in thermally conductive relation to the heat dissipating structure; and mounting the at least one LED to the outer surface.

19. A method making an LED based light comprising:

providing a base having a first end and a second end;

mounting a light structure having an inner surface and an outer surface and defining a cavity adjacent to the base so that the light structure extends along a longitudinal axis of the light;

providing a heat dissipating structure within the cavity; and mounting at least one LED in thermally conductive relation to the heat dissipating structure;

wherein:

the light structure is a light pipe having a proximal end opposing a distal end;

the inner surface is configured for substantially total internal reflection of light; and the light pipe is configured to distribute a light produced by the at least one LED in a predetermined light distribution.

20. The LED base light of claim 3 wherein the outer surface is linear and extends radially outward along the longitudinal axis of the light to form a conical shape.

21. The LED base light of claim 3 wherein the outer surface is contoured to form a bulbous profile.

* * * * *